United States Patent [19]
Tanaka et al.

[11] Patent Number: 5,825,742
[45] Date of Patent: Oct. 20, 1998

[54] INFORMATION RECORDING METHOD OF OPTICAL RECORDING MEDIUM

[75] Inventors: Tsutomu Tanaka; Tomonori Ikeya; Akihiro Itakura, all of Kanagawa, Japan

[73] Assignee: Fujitsu Limited, Kawasaki, Japan

[21] Appl. No.: 798,643

[22] Filed: Feb. 11, 1997

[30] Foreign Application Priority Data

Oct. 18, 1996 [JP] Japan .................................. 8-276674

[51] Int. Cl.⁶ ...................................................... G11B 7/00
[52] U.S. Cl. ............................................. 369/116; 369/59
[58] Field of Search ................................. 369/116, 275.3, 369/32, 13, 48, 47, 58, 59, 126

[56] References Cited

U.S. PATENT DOCUMENTS

| | | | |
|---|---|---|---|
| 5,327,411 | 7/1994 | Iwasa et al. | 369/59 |
| 5,327,414 | 7/1994 | Makino et al. | 369/59 |
| 5,408,456 | 4/1995 | Hosoya et al. | 369/59 |
| 5,636,194 | 6/1997 | Purumiya et al. | 369/59 |

FOREIGN PATENT DOCUMENTS

| | | |
|---|---|---|
| 1143041 | 6/1989 | Japan . |
| 322223 | 1/1991 | Japan . |
| 684224 | 3/1994 | Japan . |
| 6150429 | 5/1994 | Japan . |
| 7244877 | 9/1995 | Japan . |

*Primary Examiner*—Nabil Hindi
*Attorney, Agent, or Firm*—Greer, Burns, Crain, Ltd.

[57] ABSTRACT

An information recording method of an optical recording medium capable of reducing the edge shift and jitter by irradiating the optical recording medium with a light beam by pulse emission in five power values, when forming recording marks and spaces of small dimensions.

9 Claims, 35 Drawing Sheets

INFORMATION RECORDING METHOD OF OPTICAL RECORDING MEDIUM

BACKGROUND OF THE INVENTION

The present invention relates to an information recording method of an optical recording medium for forming a recording mark by irradiation of light beam, and more particularly to an information recording method using a mark edge recording system onto a magneto-optical recording medium for reproducing at magnetically induced super-resolution (MSR) capable of recording at high density.

Recently, along with the request for higher density of information in magneto-optical disk, the mark edge recording system is employed as information recording method in magneto-optical recording medium. The mark edge recording system is a recording method in which "1" of binary information data corresponds to the edge of recording mark, and the information can be recorded at higher density as compared with the mark position recording system in which the recording mark corresponds to "1".

Besides, as the method for realizing higher density of information, the MSR reproducing system is noticed. The MSR reproducing system is a reproducing method capable of reproducing a recording mark formed in a smaller size than the beam spot diameter, and various methods have been proposed. The present applicant previously proposed an MSR medium which is a magneto-optical disk that can be reproduced at MSR in Japanese Patent Application Laid-Open No. 7-244877 (1995). FIG. 1 and FIG. 2 are diagrams showing the state of magnetization in reproduction of the MSR mediums disclosed in Japanese Patent Application Laid-Open Nos. 7-244877 (1995), 1-143041 (1989), respectively. FIG. 1 shows to a RAD (rear aperture detection) system, and FIG. 2 shows a FAD (front aperture detection) system.

As shown in FIG. 1, a magneto-optical disk 50 is formed from laminating a readout layer 51, an intermediate layer 52, and a recording layer 53 in this order on a substrate (not shown). The readout layer 51 is formed of a rare-earth transition-metal amorphous alloy film such as GdFeCo, and has an easily magnetizable axis in the perpendicular direction. The intermediate layer 52 is formed of a rare-earth transition-metal amorphous alloy film such as GdFe, and has an easily magnetizable axis in the in-plane direction at room temperature, and when raised to a predetermined temperature by irradiation of laser beam, the easily magnetizable axis is changed from the in-plane direction to the perpendicular direction. The recording layer 53 is formed of a rare-earth transition-metal amorphous alloy film such as TbFeCo and DyFeCo, and has an easily magnetizable axis in the perpendicular direction. Supposing the respective curie temperature of the readout layer 51, intermediate layer 52, and recording layer 53 to be Tc1, Tc2, Tc3, the relation of Tc2<Tc1, Tc2<Tc3 is satisfied. Supposing the respective coercive force of the readout layer 51 and recording layer 53 at room temperature to be Hc1, Hc3, the relation of Hc1<Hc3 is satisfied.

The readout layer 51 has the function of reading out signal or functions as a mask layer for magnetically induced super-resolution. The intermediate layer 52 shows an in-plane property about the direction of magnetization at room temperature, but as the temperature is raised, the exchange coupled force generates between the intermediate layer 52 and the recording layer 53, and direction of magnetization of the intermediate layer 52 is transferred onto the readout layer 51. The recording layer 53 inverts the direction of magnetization as the temperature is raised nearly to the curie temperature while applying magnetic field for recording, so that thermomagnetic recording is effected.

When reproducing the data recorded in the recording layer 53, by making use of the temperature gradient produced in a laser spot 55 formed on the medium, a small recording mark is reproduced. In a region of low temperature in the laser spot 55, since the magnetization of the intermediate layer 52 is directed in the in-plane direction, magnetization of the readout layer 51 is aligned in the upward direction (front mask). On the other hand, in a medium temperature region higher than the low temperature region, the recording layer 53 magnetically exchanged and coupled with the intermediate layer 52, and the intermediate layer 52 magnetically exchanged and coupled with the readout layer 51, and data in the recording layer 53 is transferred onto the readout layer 51, thereby forming an opening. In a high temperature region of higher temperature, the temperature exceeds the curie temperature Tc2 of the intermediate layer 52, and the direction of magnetization of the readout layer 51 is aligned in the readout magnetic field direction (rear mask). In this way, when a magneto-optic output is detected by using the RAD system, the low temperature region and the high temperature region form a mask magnetically in the laser spot 55, and magneto-optic signal is not read out from this region. Moreover, it is possible to reproduce at magnetically induced super-resolution without disposing initializing magnet for applying a large magnetic field and a high reproduction output can be obtained, so that a small mark below the diffraction limit of wavelength of laser beam can be reproduced accurately.

Next is described the FAD system shown in FIG. 2. In the FAD system, the high temperature region in the laser spot 55 is a mask region, and a recording mark is read out from the low temperature region. A magneto-optical disk 60 is formed, as shown in FIG. 2, from a readout layer 61, a switch layer 62, and a recording layer 63 laminated in this order on a substrate (not shown). At room temperature, the direction of magnetization of the readout layer 61 is same as in the recording layer 63 by a exchange coupled force through the switch layer 62. However, in the portion (mask) of the readout layer increasing in temperature and exceeding the curie temperature of the switch layer 62 by irradiation of laser beam, the exchange coupled force with the recording layer 63 is cut off, and the direction of magnetization in that portion of the readout layer 61 is aligned with the direction of the readout magnetic field applied from outside. As a result, the high temperature region becomes a mask for concealing and covering the formed recording mark, and in the low temperature region, the recorded data in the recording layer 63 is transferred onto the readout layer 61, and an opening is formed. In this method, however, because of reproduction from the low temperature region, the opening is wide, and the obtained signal output is smaller than that of the above RAD system.

By thus forming the recording mark of MSR medium by mark edge recording system, information can be recorded at much higher density. The forming method of recording mark by the conventional mark edge recording system is described below. FIG. 3 is a diagram showing recording waveform of laser beam and recording mark length according to the conventional mark edge recording system, and the recording mark is formed according to multi-pulse recording system. As shown in the diagram, in the recording mark forming portion of mark length of 2T, laser beam is emitted for a period of (3/2)T at power value Pw1 to MSR medium. After irradiating for T period at power value Pb, the space is formed by irradiating at power value Pa up to the next recording mark forming portion. Herein, T is the clock period.

In the recording mark forming portion of 3T, after emitting laser beam at power value Pw1 for (3/2)T period, laser beam is irradiated at power value Pa for (1/2)T period, and at power value Pw2 for (1/2)T period. In the recording mark forming portion of 4T, after emitting laser beam at power value Pw1 for (3/2)T period, laser beam is emitted twice alternately at power value Pa and power value Pw2 for (1/2)T period each. Herein, the power values are in the relation of Pw2>Pw1>Pa>Pb. In such multi-pulse recording system, in the recording mark forming portion of 3T or longer, after emitting laser beam of power value Pw1, pulse beams with power value Pw2 at upper edge and power value Pa at lower edge are emitted by the number according to the length of the recording mark. As a result, the number of pulse beams increases as the recording mark length is long, and therefore in the case of low recording frequency, that is long recording mark, heat is not accumulated more than necessary, and edge shift of recording mark can be reduced.

However, when the recording mark is formed according to multi-pulse recording system into such MSR medium, for a signal high in recording frequency, a recording mark smaller in diameter than the readout beam diameter must be formed, and the recording beam diameter is reduced to emit. At this time, the effect of heat of the recording mark onto the edge is greater than in the case of irradiation of ordinary recording beam, which produced the problem of tendency of forming edge shift in short recording mark such as 2T and 3T.

BRIEF SUMMARY OF THE INVENTION

The invention is devised to overcome the above problem, and it is an object of the invention to reduce edge shift and jitter in high frequency recording, by forming recording marks according to the multi-pulse recording system using five power values.

An information recording method of the invention is an information recording method of optical recording medium for recording binary information from a series of recording marks and spaces between the recording marks, comprising the step of determining the length of the recording mark and space depending on the information to be recorded so that one of the binary information may correspond to the front edge and rear edge of the recording mark, and the step of irradiating the optical recording medium with a light beam by pulse emission of the light beam, in accordance with the length of the recording mark and space, wherein the light beam is emitted at least in five power values including the bottom power value which is the lowest edge of the pulse, and when forming the recording mark, the light beam is emitted at least in four power values including the bottom power value, and when forming the space, the light beam is emitted in at least two power values including the bottom power value.

The information recording method of the invention is an information recording method of an optical recording medium for recording binary information by a series of recording marks and the spaces between the recording marks, comprising the step of determining the length of the recording mark and the space depending on the information to be recorded so that one of the binary information may correspond to the front edge and rear edge of the recording mark, and the step of irradiating the optical recording medium with a light beam by pulse emission of the light beam, in accordance with the length of the recording mark and the space, wherein the light beam is emitted at bottom power value Pb for cooling the optical recording medium, first main heat power value Pw1 for, second main heat power value Pw2 for and, first preheat power value Paw for forming recording mark, and second preheat power value Pae for forming the space, and the following relation holds.
Pw1>Paw, Pw1>Pae, Pw1>Pb
Pw2>Paw, Pw2>Pa, Pw2>Pb
Paw>Pb, Pae>Pb, Paw≠Pae Moreover, in the information recording method of the invention, the power value of light beam for forming the recording mark is different from the power value for forming the space, except for the bottom power value.

Therefore, by forming the recording mark by using at least four power values including the bottom power value, even when a recording mark of a smaller diameter than the readout beam diameter is formed on the MSR medium, increase of edge shift and jitter of recording mark can be suppressed. FIG. 8 described later shows a recording waveform of five power values in an embodiment of the invention, and FIG. 15 shows a recording waveform of four power values as a comparative example. The difference between the two lies in the power value of the pulse lower edge when forming the recording mark. In the embodiment of the invention, the pulse lower edge is the first preheat power value Paw, which is different from the preheat power value Pae of the space portion, whereas in the comparative example, the pulse lower edge is the power value Pa, which is same as the preheat power value of the space portion. When recording marks are formed of these recording waveforms, as seen from the results shown in FIG. 11 and FIG. 12, and FIG. 16 and FIG. 17 described later, it is known that the edge shift and jitter are decreased in the embodiment of the invention, especially in high frequency recording, as compared with the comparative example.

Also in the information recording method of optical recording medium of the invention, the bottom power value is zero.

Therefore, from the result of measurement about the embodiment of the invention described below (see FIG. 18, FIG. 25, and FIG. 32), it is known that the edge shift and jitter are further decreased in the case of Pb=0.

It is also a characteristic of the information recording method of an optical recording medium of the invention that the first main heat power value Pw1 and second main heat power value Pw2 satisfy the relation of Pw1−1.5 mW≦Pw2≦Pw1+1.5 mW.

Therefore, from the result of measurement in the embodiment of the invention described below (see FIG. 19, FIG. 26, and FIG. 33), it is known that the edge shift and jitter are further decreased in the case of Pw1−1.5 mW≦Pw2≦Pw1+ 1.5 mW.

It is other characteristic of the information recording method of an optical recording medium of the invention that the first main heat power value Pw1 and first preheat power value Paw satisfy the relation of 1.5 mW≦Pw1/Paw≦3.5 mW.

Therefore, from the result of measurement in the embodiment of the invention described below (see FIG. 20, FIG. 27, and FIG. 34), it is known that the edge shift and jitter are further decreased in the case of 1.5 mW≦Pw1/Paw≦3.5 mw.

It is a further characteristic of the information recording method of an optical recording medium of the invention that the first main heat power value Pw1 and second preheat power value Pae satisfy the relation of 1.8≦Pw1/Pae.

Therefore, from the result of measurement in the embodiment of the invention described below (see FIG. 21, FIG. 28, and FIG. 35), it is known that the edge shift and jitter are further decreased in the case of 1.8≦Pw1/Pae.

The above and further objects and features of the invention will more fully be apparent from the following detailed description with the accompanying drawings.

DETAILED DESCRIPTION OF THE INVENTION

Figure 1:
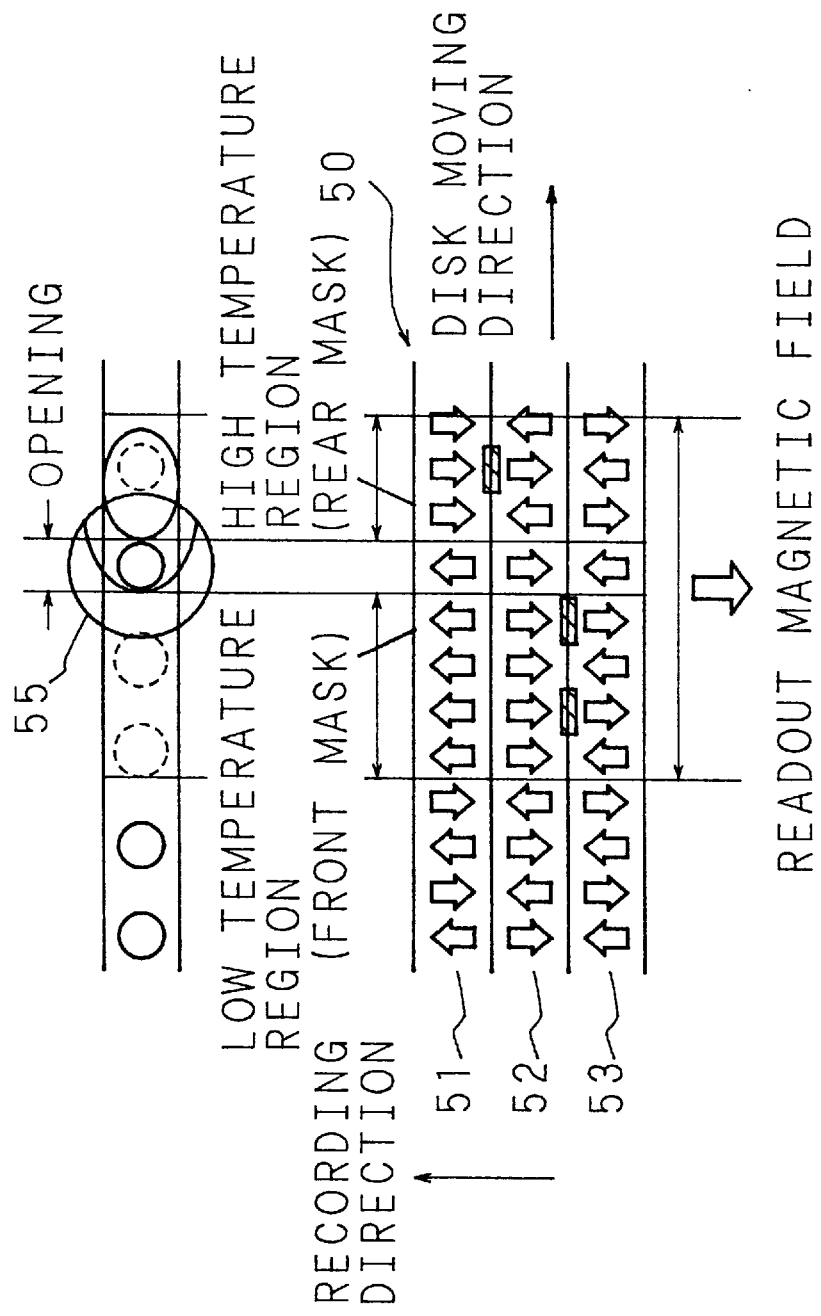
FIG. 1 is a diagram showing a magnetized state according to conventional MSR reproducing system (RAD)

Referring now to the drawings, embodiments of the invention are described specifically below.

Figure 4:
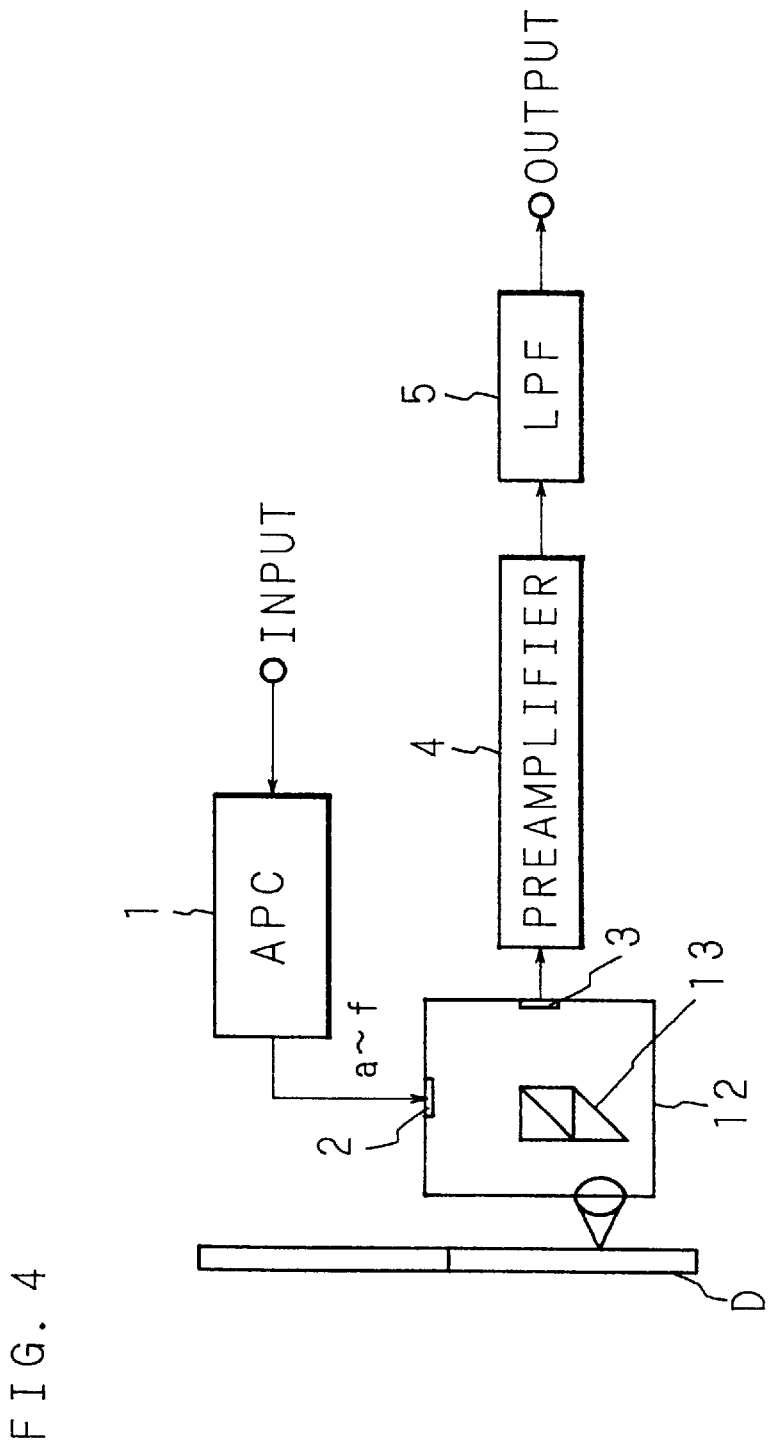
FIG. 4 is a block diagram showing a constitution of a recording and reproducing apparatus employed in a recording method of the invention.

FIG. 4 is a block diagram showing a constitution of recording and reproducing apparatus used in execution of a recording method of the invention. In the diagram, D denotes a magneto-optical disk having a film composition as described below, which is disposed oppositely to an optical head 12. Through an input system terminal, coded data to be recorded is fed into an APC (automatic laser power controller) 1. The APC 1 is a control mechanism for outputting a signal for controlling the power of the laser beam emitted from the optical head 12, and signals a to f depending on the input data are outputted to a laser diode (LD) circuit 2.

Figure 5:
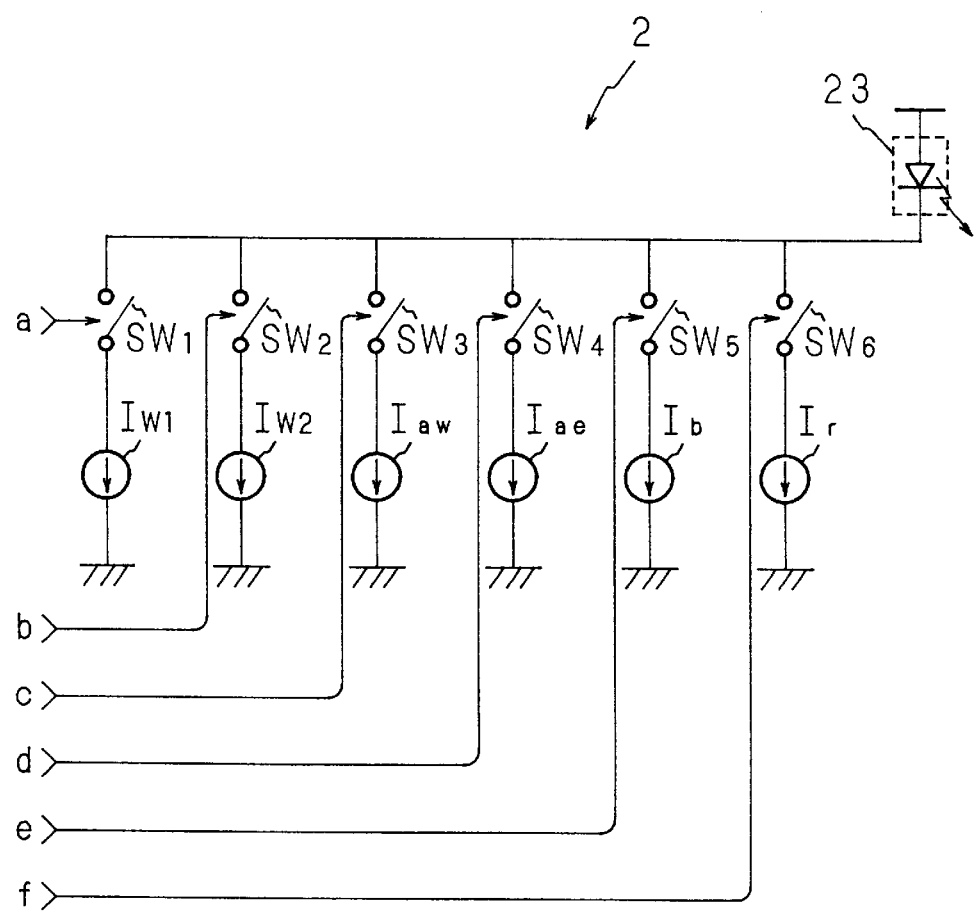
FIG. 5 is a circuit diagram showing a constitution of an LD circuit shown in FIG. 4.

FIG. 5 is a circuit diagram showing a constitution of the LD circuit 2 shown in FIG. 4. The LD circuit 2 includes a semiconductor laser source 23 and a control circuit of the semiconductor laser source 23, and the LD circuit 2 is a circuit for emitting laser beam of predetermined power value from the semiconductor laser source 23 on the basis of an input signal. As shown in FIG. 5, the control circuit of the semiconductor laser source 23 is composed of first to sixth constant current sources $Iw_1$, $Iw_1$, Iaw, Iae, Ib, Ir, and first to sixth switches $SW_1$, $SW_2$, $SW_3$, $SW_4$, $SW_5$, $SW_6$ connected between each constant current source and semiconductor laser source 23. The first to sixth switches $SW_1$ to $SW_6$ are designed to feed/cut off the current from the first to sixth constant current sources $Iw_1$ through Ir to the semiconductor laser source 23 according to on/off switching thereof, and the on/off control of the first to sixth switches $SW_1$ to $SW_6$ is effected according to the output of signals a to f inputted from the APC 1.

That is, the first constant current source $Iw_1$ gives a set current value to the semiconductor laser source when the first switch $SW_1$, is closed by supplying signal a. The second constant current source $Iw_2$ gives a set current value to the semiconductor laser source when the second switch $SW_2$ is closed by supplying signal b. The third constant current source Iaw gives a set current value to the semiconductor laser source when the third switch $SW_3$ is closed by supplying signal c. The fourth constant current source Ia gives a set current value to the semiconductor laser source when the fourth switch $SW_4$ is closed by supplying signal d. The fifth constant current source Ib gives a set current value to the semiconductor laser source when the fifth switch $SW_5$ is closed by supplying signal e. The sixth constant current source Ir gives a set current value to the semiconductor laser source when the sixth switch $SW_6$ is closed by supplying signal f. The current value given to the semiconductor laser source 23 is the sum of the set current values supplied from the first to sixth constant current sources Iw1 to Ir.

The laser beam emitted from thus constituted laser circuit 2 irradiates the magneto-optical disk D through an optical mechanism 13 incorporated in the optical head 12, and (1,7)RLL modulation code is recorded in the magneto-optical recording disk D. At this time, the magneto-optical disk D is rotated by a motor not shown at 2400 rpm. The shortest mark in the (1,7)RLL modulation code is 0.34 µm, the wavelength of laser beam is 680 nm, and the number of apertures (NA) of the objective lens of the optical mechanism 13 is 0.55. The data is thus recorded in the magneto-optical disk D, the laser beam for reproduction is emitted to the magneto-optical disk D, and its reflected light is put into a photo diode (PD) circuit 3 through the optical mechanism 13 and is converted into an electrical signal to be inputted to a preamplifier 4. The reproduction signal amplified in the preamplifier 4 is inputted to a low pass filter (LPF) 5 to be rid of noise in high frequency region, and is outputted from an output system terminal.

Figure 2:
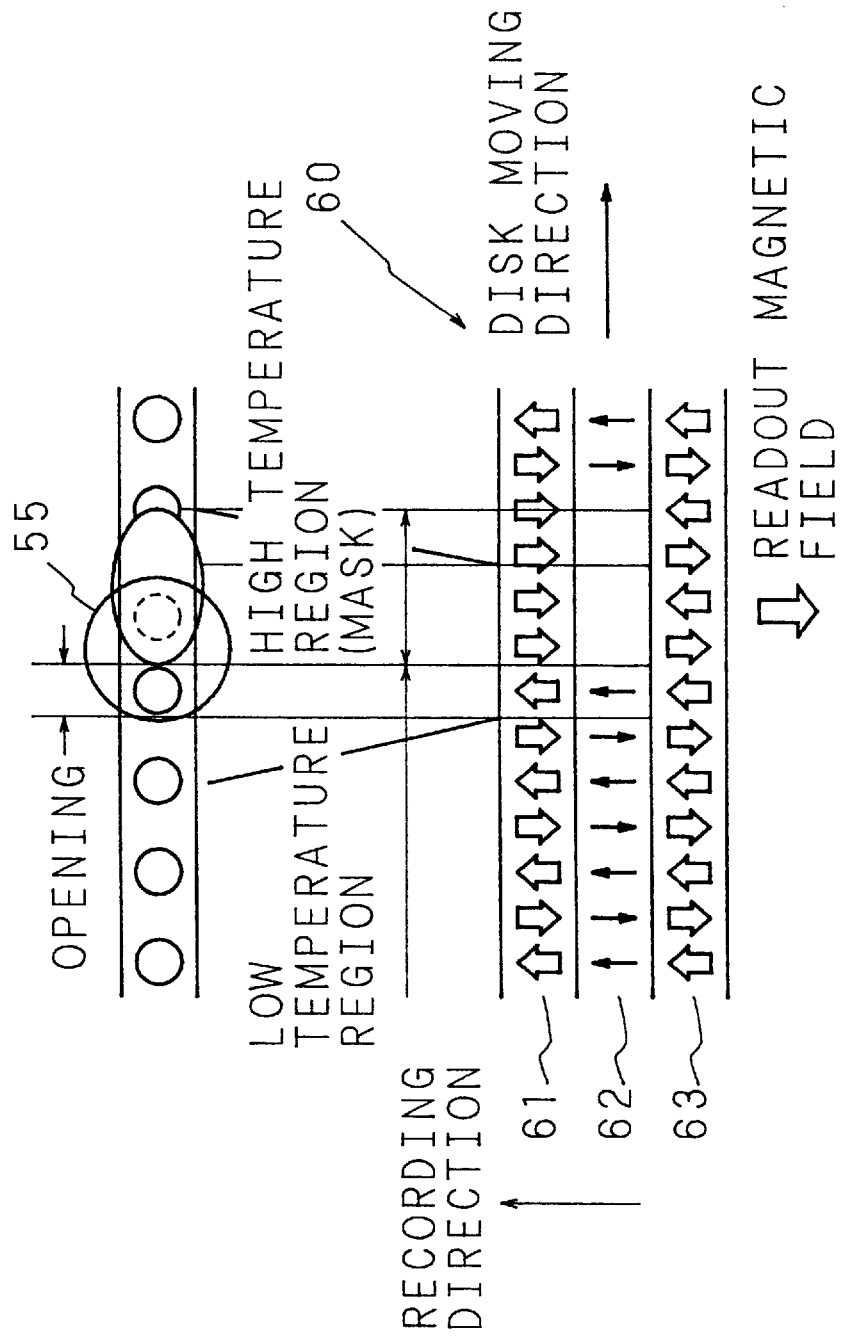
FIG. 2 is a diagram showing a magnetized state according to conventional MSR reproducing system (FAD)
Figure 6:
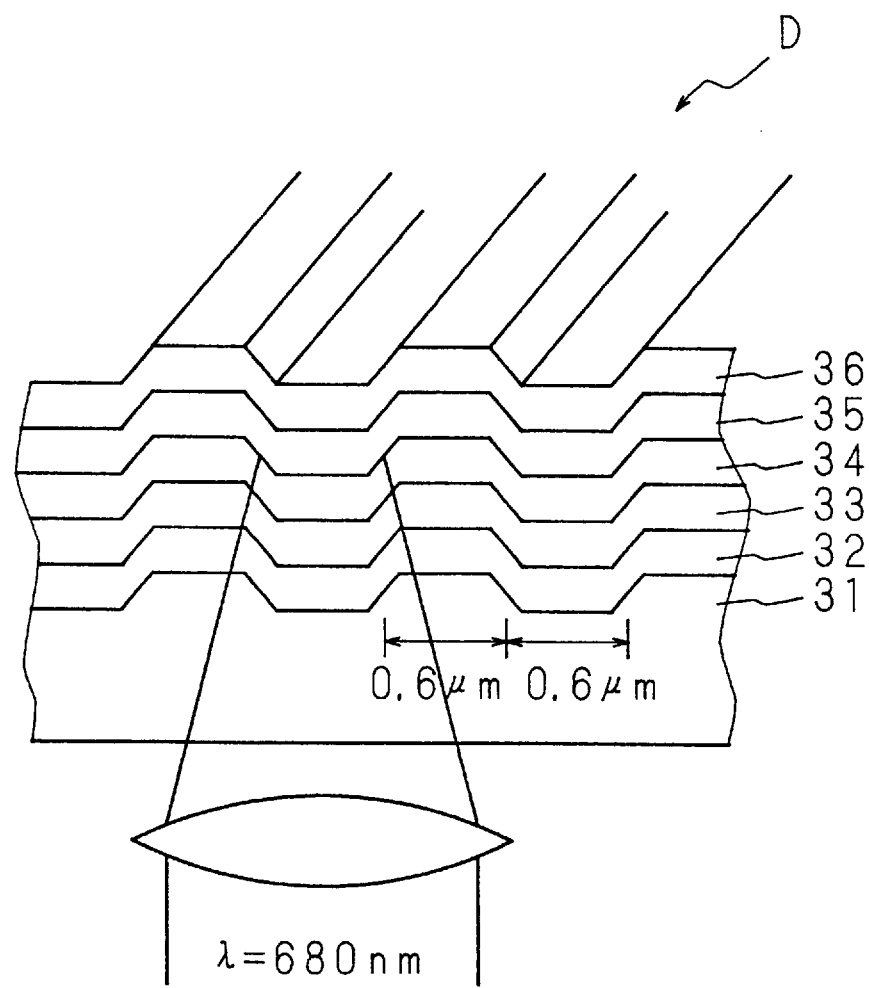
FIG. 6 is a film composition diagram of magneto-optical disk in which a recording mark is formed by a recording method of the invention.
Figure 7:
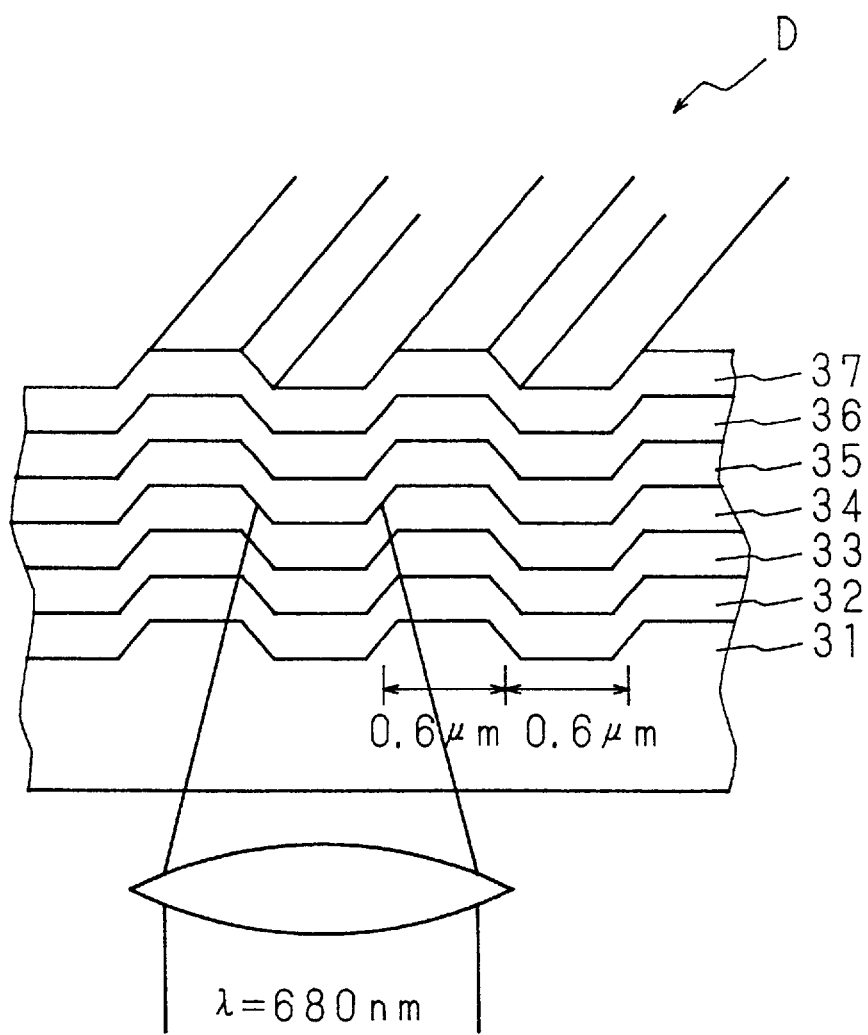
FIG. 7 is a film composition diagram of other magneto-optical disk in which a recording mark is formed by a recording method of the invention.

The film composition in the magneto-optical disk D used in the information recording method of the invention is described below. FIG. 6 is a film composition diagram of the magneto-optical disk used in the invention. As shown in FIG. 6, the magneto-optical disk D is formed by laminating a dielectric layer 32, a readout layer 33, an intermediate layer 34, a recording layer 35, and a protective layer 36 on a substrate 31 in which lands and grooves are formed at a pitch of 0.6 µm each so as to be capable of recording in lands/grooves. FIG. 7 is a film composition diagram of other magneto-optical disk used in the invention, in which a reflection layer 37 is laminated on a protective layer 36. Both show the film compositions applicable to MSR reproduction shown in FIG. 1 and FIG. 2.

First embodiment

Figure 8:
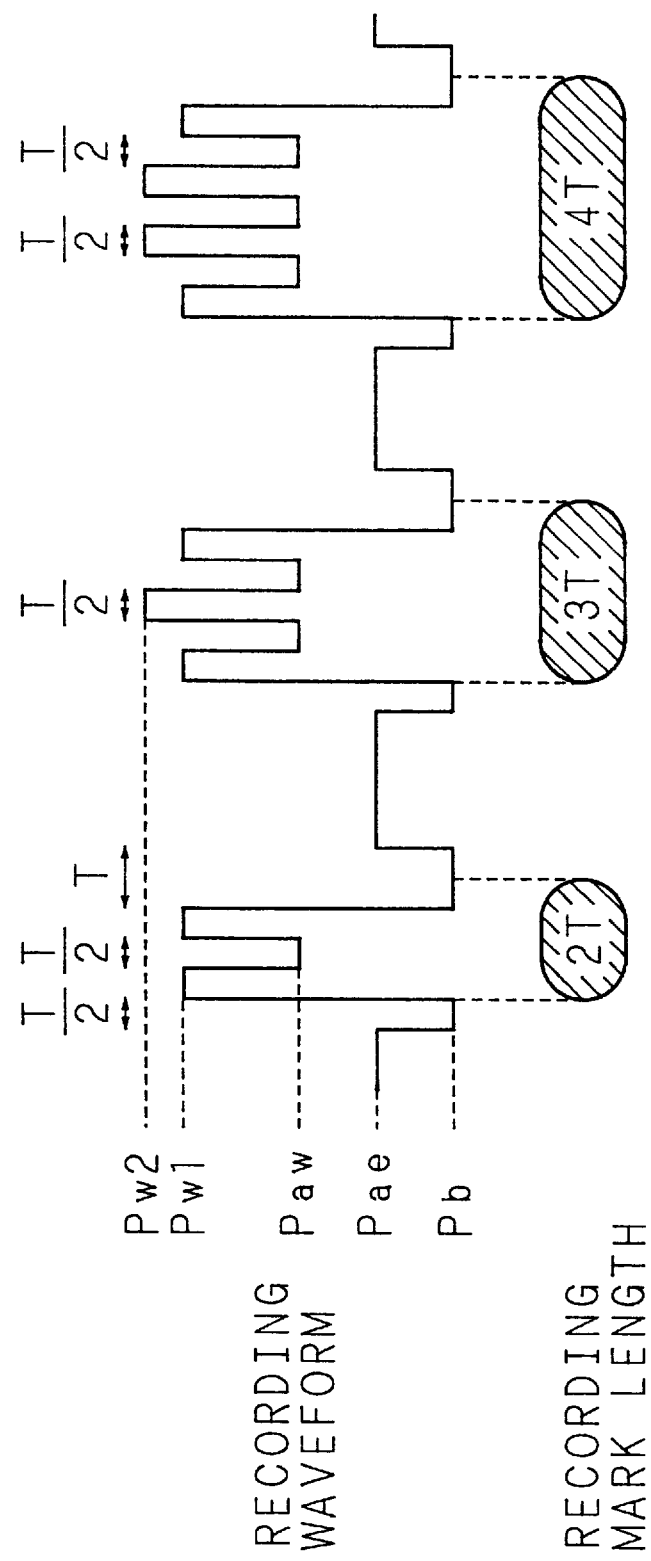
FIG. 8 is a diagram showing recording waveform and recording mark by a recording method of a first embodiment.

Using the above recording and reproducing apparatus, (1,7)RLL modulation codes were recorded in both lands and grooves of the magneto-optical disk D. FIG. 8 is a diagram showing recording waveform and recording mark by the recording method of a first embodiment of the invention, in which a recording mark is formed by multi-pulse recording method. The film composition of the magneto-optical disk D is same as the film composition shown in FIG. 6, and the substrate 31 and each layer have the film material and film thickness as specified below, and the MSR reproduction of FAD system is possible in the same way as the principle of reproduction explained in FIG. 2.

Substrate 31: Polycarbonate
Dielectric layer 32: SiN, 70 nm
Readout layer 33: GdFeCo (rare-earth magnetization dominant), 27 nm
Intermediate layer 34: TbFe (transition-metal magnetization dominant), 8 nm
Recording layer 35: TbFeCo (transition-metal magnetization dominant), 50 nm
Protective layer 36: SiN, 90 nm As shown in FIG. 8, in the recording mark forming portion of mark length of 2T, laser beam is emitted to the disk D at the first main heat power value Pw1 for (1/2)T period, at the first preheat power value Paw for (1/2)T period, at the power value Pw1 again for (1/2)T period, and at the bottom power value Pb for (1/2)T period. In the space portion, in succession, it is emitted at the power value of Pb for (1/2)T period, at the second preheat power value Pae until (1/2)T period before the next recording mark forming portion, and at the power value Pb for the (1/2)T period. Herein, T is the clock period.

In the recording mark forming portion of 3T, laser beam is emitted at the power value Pw1 for (1/2)T period, at the power value Paw for (1/2)T period, at the second main heat power value Pw2 for (1/2)T period, at the power value Paw for (1/2)T period, at the power value Pw1 again for (1/2)T period, and at the power value Pb for (1/2)T period. In the recording mark forming portion of 4T, laser beam is emitted at the power value Pw1 for (1/2)T period, at the power value Paw and power value Pw2 for (1/2)T period alternately twice each, at the power value Paw for (1/2)T period, at the power value Pw1 for (1/2)T period, and at the power value Pb for (1/2)T period.

In the embodiment, accordingly, in the recording mark forming portion, pulse beam of power value Pw1 at the upper edge and power value Paw at the lower edge is used for the shortest mark (2T), and pulse beam of Pw1 at the upper edge and Paw at the lower edge, and pulse beam of Pw2 at the upper edge and Paw at the lower edge are used for the 3T and longer mark. In the recording mark of 3T and longer, pulse beam of Pw2 at the upper edge is emitted by the number according to the length of the recording mark. The space between the recording marks is irradiated with laser beam at the power value Pb for (1/2)T period, and at the power value Pae for (1/2)T period before the next recording mark forming portion, and at the power value Pb for (1/2)T period, and therefore by irradiating with the laser beam of power value Pb for (1/2)T period at the beginning and at the end, the edges of the recording mark are formed sharply. Moreover, by irradiating with the laser beam at the power value Pb for (1/2)T period at the end of each recording mark, effects of accumulated heat onto the next recording mark are alleviated.

Meanwhile, in the embodiment, the power values of laser beam satisfy the relation of Pw1>Paw, Pw1>Pae, Pw1>Pb, Pw2>Paw, Pw2>Pae, Pw2>Pb, Paw>Pb, Pae>Pb, Paw≠Pae. When emitting laser beam at power value Pb, the fifth and sixth switches $SW_5$, $SW_6$ shown in FIG. 5 are turned on, when emitting at power value Pae, the fourth to sixth switches $SW_4$ to $SW_6$ are turned on, when emitting at power value Paw, the third to sixth switches $SW_3$ to $SW_6$ are turned on, when emitting at power value Pw1, the second to sixth switches $SW_2$ to $SW_6$ are turned on, and when emitting at power value Pw2, the first to sixth switches $SW_1$ to $SW_6$ are turned on.

Thus, in the recording system of the first embodiment, the power value of laser beam is modulated into four values of Pw1, Pw2, Paw, Pb when forming the recording mark, and modulated into two values of Pae and Pb when forming the space, and hence information is recorded in the magneto-optical disk D by using a total of five power values.

Figure 9:
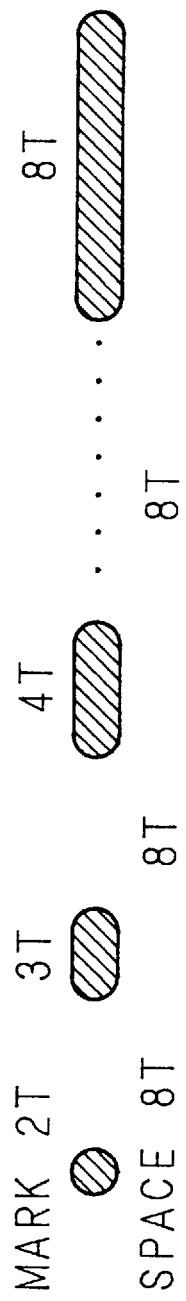
FIG. 9 is a diagram showing a recording mark pattern for measuring pattern-shift.
Figure 10:
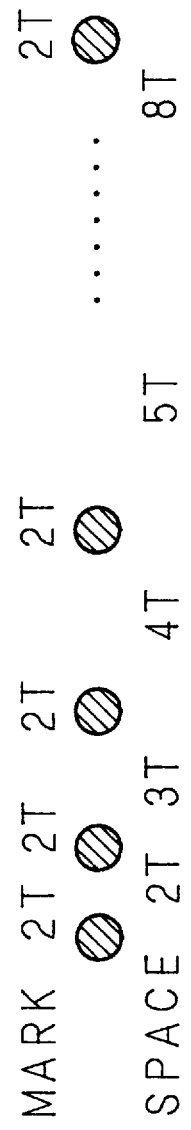
FIG. 10 is a diagram showing a recording mark pattern for measuring thermal-shift.

The edge shift and jitter of the recording mark thus formed according to this recording system were measured. To evaluate the edge shift, the shift amount of the edge was measured in the recording mark formed in the pattern-shift pattern and in the recording mark formed in the thermal-shift pattern, respectively. FIG. 9 and FIG. 10 are diagrams showing the recording mark length and space interval for measuring the pattern-shift and thermal-shift, respectively. As shown in FIG. 9, in the pattern-shift pattern, the recording mark length is varied under keeping the space interval constant. In this pattern, effects of the heat on the rear edge of the recording mark when forming the recording mark can be evaluated. As shown in FIG. 10, in the thermal-shift pattern, the space interval is varied under keeping the recording mark length constant. In this pattern, effects of preheat in space interval onto the front edge of next recording mark can be known.

Figure 11:
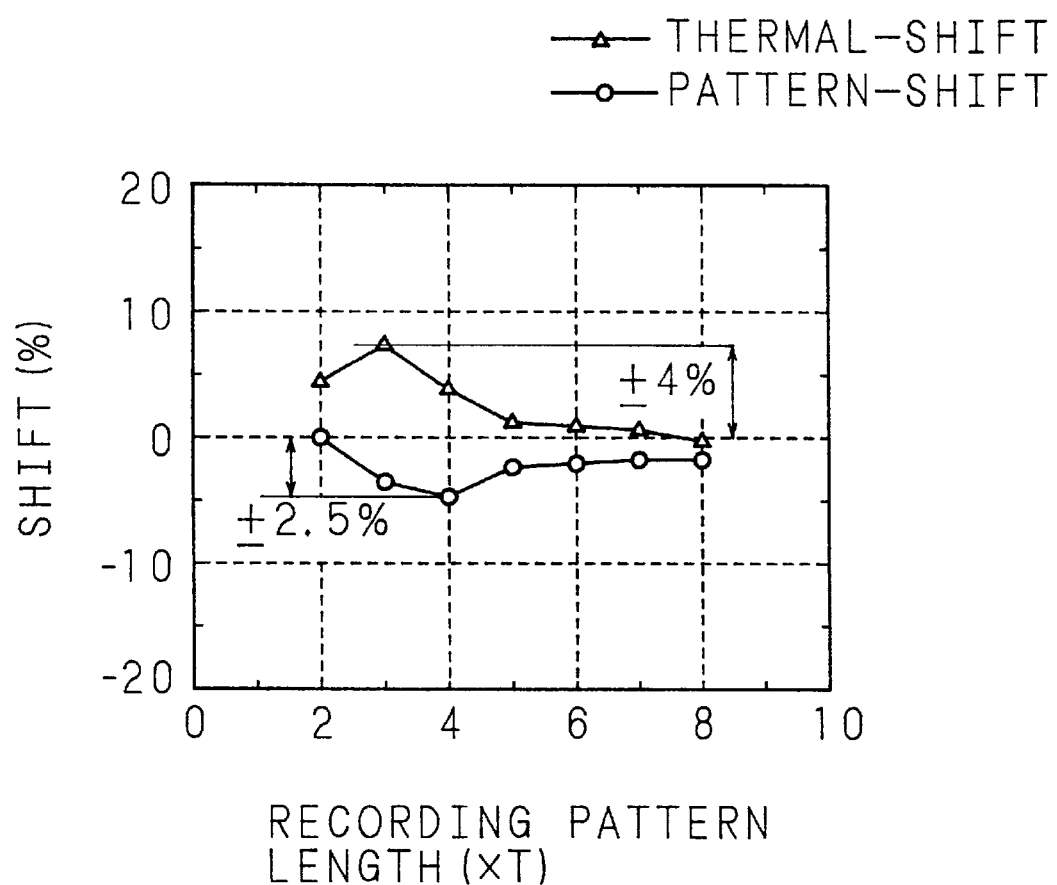
FIG. 11 is a graph showing an edge shift of recording mark formed by the recording method shown in FIG. 8.

Employing the recording method of the first embodiment, recording marks were formed in both pattern-shift pattern and thermal-shift pattern, and both pattern-shift and thermal-shift were measured. FIG. 11 is a graph showing results of measurement of shift of recording mark. The axis of ordinates represents the shift (%), and the axis of abscissas denotes the recording pattern length (XT). To evaluate the shift (%) of pattern-shift pattern, the time according to the length of formed recording mark is measured by using a time interval analyzer, and the rate of time difference of recording mark of each length is computed on the basis of the time of the shortest recording mark (2T in the case of (1,7)RLL modulation code). To evaluate the shift (%) of thermal-shift pattern, similarly, the time according to the length of the space is measured, and the rate of time difference of space of each length is computed on the basis of the time of the longest space (8T in the case of (1,7)RLL modulation code). As is known from FIG. 11, the range of pattern-shift is ±2.5% and the range of thermal-shift is ±4%.

Figure 12:
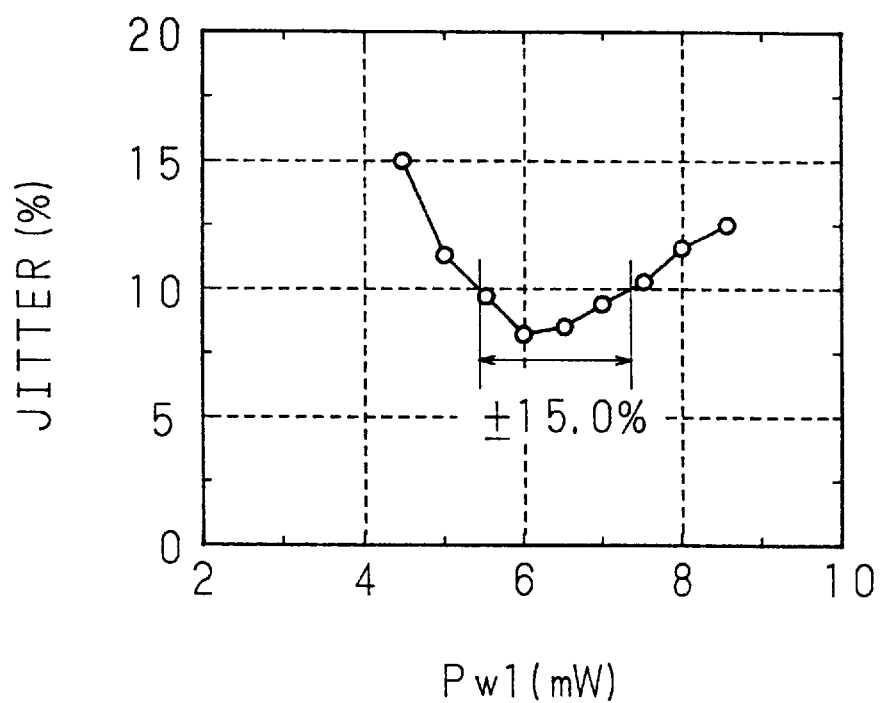
FIG. 12 is a graph showing recording power margin of recording mark formed by the recording method shown in FIG. 8.

Moreover, employing the recording method of the first embodiment, the recording mark was formed by random pattern (a mixed pattern of pattern-shift pattern and thermal-shift pattern), and the recording power margin was determined from the measured jitter (%). FIG. 12 is a graph showing the result of determining the recording power margin. The axis of ordinates indicates the jitter (%), and the axis of abscissas shows the power value Pw1. Herein, jitter of 10% or less is regarded as recording power margin. As is known from FIG. 12, the recording power margin is ±15.0%. The jitter is calculated as the standard deviation of time deviation of edge of recording mark and edge of reference clock, and this shows the rate to the reference clock. The jitter of each power value Pw1 shown in FIG. 12 shows the most favorable value of the jitter values computed by differing the power value Pw2 relative to each power value Pw1.

Figure 3:
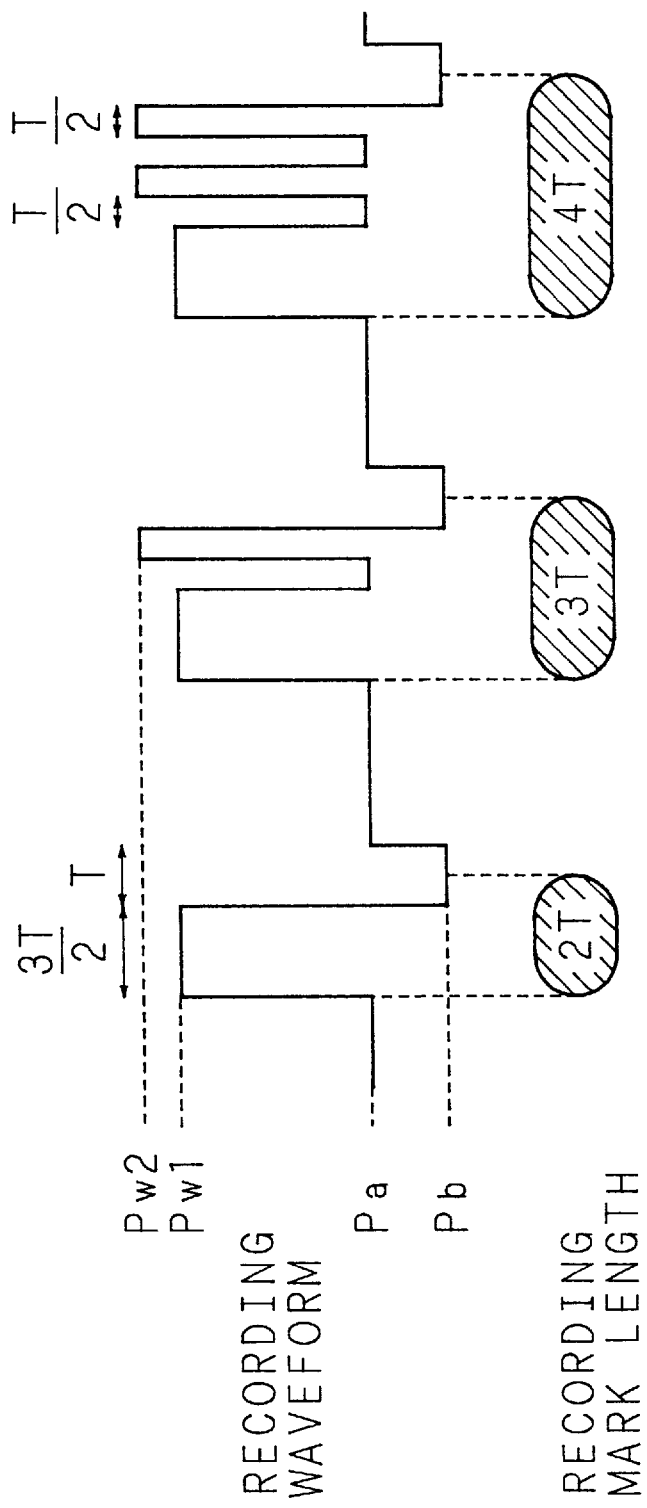
FIG. 3 is a diagram showing recording waveform and recording mark by a conventional recording method.
Figure 13:
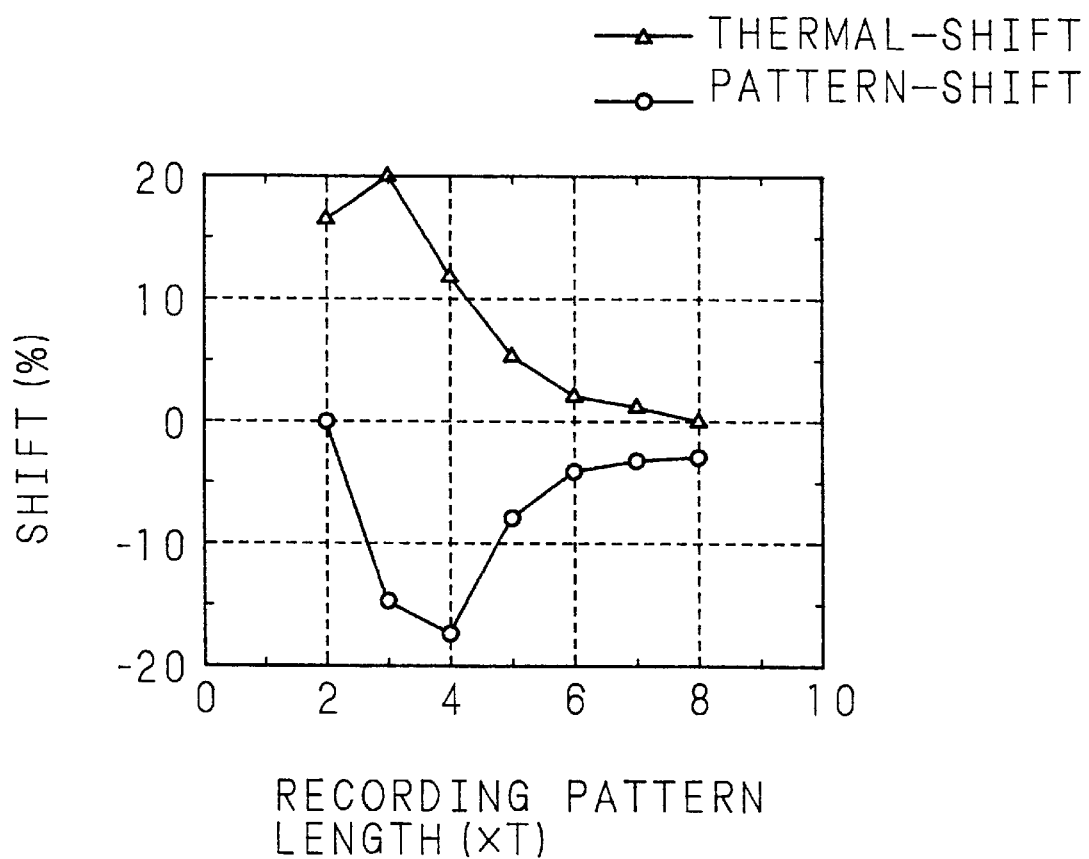
FIG. 13 is a graph showing edge shift of recording mark formed by the conventional recording method.
Figure 14:
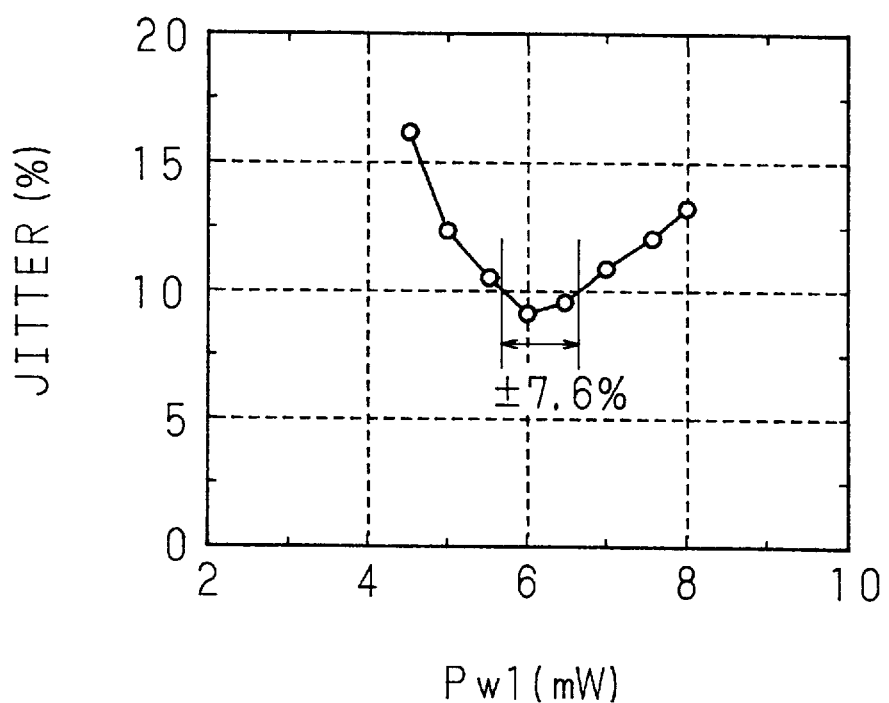
FIG. 14 is a graph showing recording power margin of recording mark formed by the conventional recording method.

To compare with the first embodiment, a recording mark was formed by a conventional recording method of modulating the laser beam power value into four values as shown in FIG. 3, and the shift and recording power margin were measured. The magneto-optical disk used in the conventional recording method has the same film composition as the magneto-optical recording disk D used in the first embodiment, and the measuring method of the shift and the recording power margin is same as in the first embodiment. FIG. 13 is a graph showing the results of measuring the shift of conventional recording mark, and FIG. 14 is a graph showing the result of determining the recording power margin in the conventional recording method. The measuring method of the shift and the recording power margin is same as in FIG. 11 and FIG. 12.

As known from FIG. 13, in the conventional recording mark formed by modulating laser beam into four values, the pattern-shift and thermal-shift were both out of ±10% range. Also as is known from FIG. 14, the recording power margin is ±7.6%. Usually, considering the reliability of the magneto-optical recording apparatus, the shift of recording mark of magneto-optical disk must be suppressed within ±10%, and the jitter also within ±10%. In the conventional recording method, since the shortest recording mark is smaller than the beam diameter, the shift of recording mark of 2T and 3T is large (see FIG. 13), and hence it is estimated that the shift and the jitter of recording mark are increased.

Figure 15:
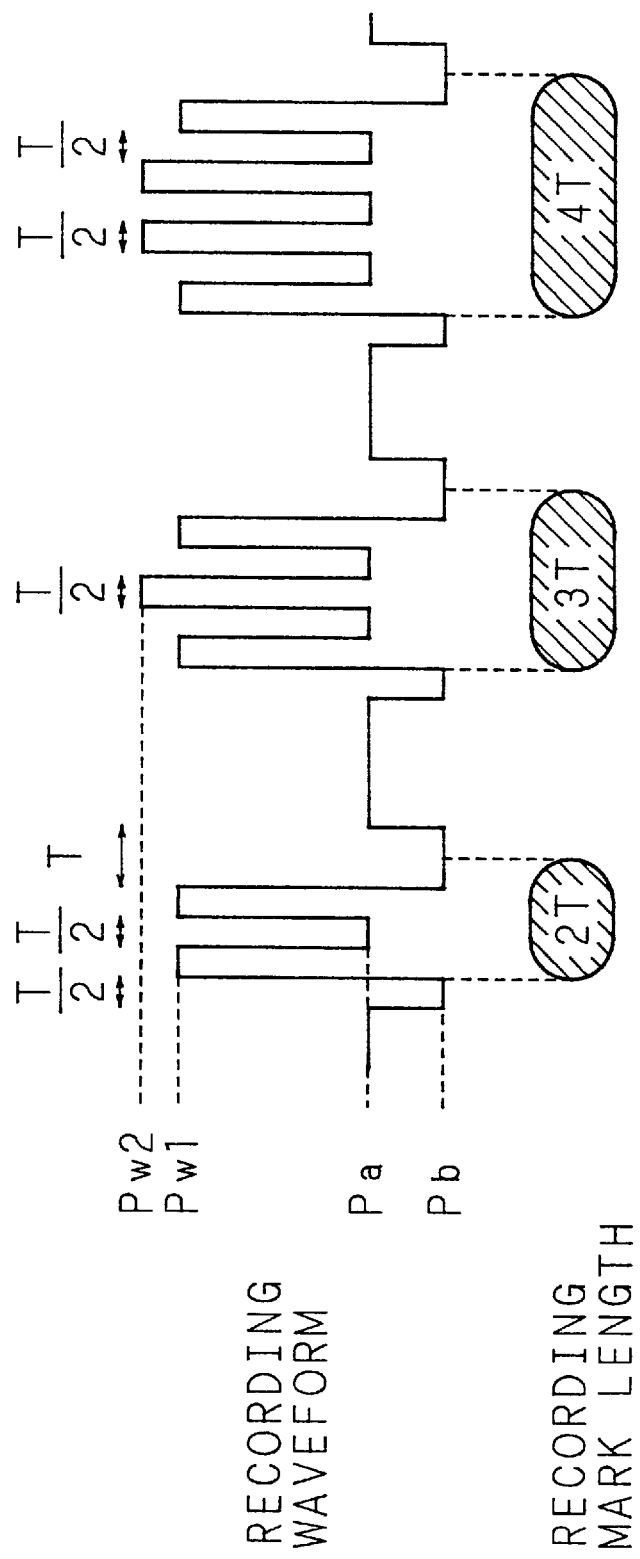
FIG. 15 is a diagram showing recording waveform and recording mark by the recording method of the comparison example.
Figure 16:
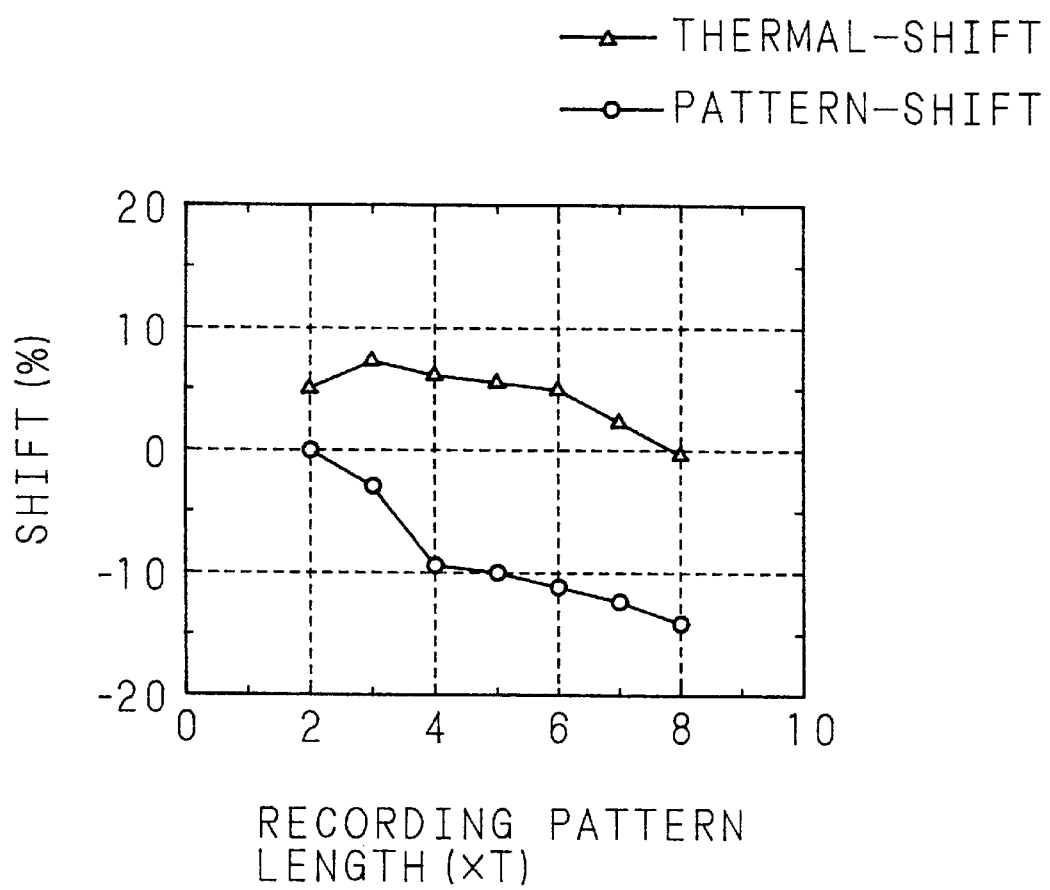
FIG. 16 is a graph showing edge shift of recording mark formed by the recording method shown in FIG. 15.
Figure 17:
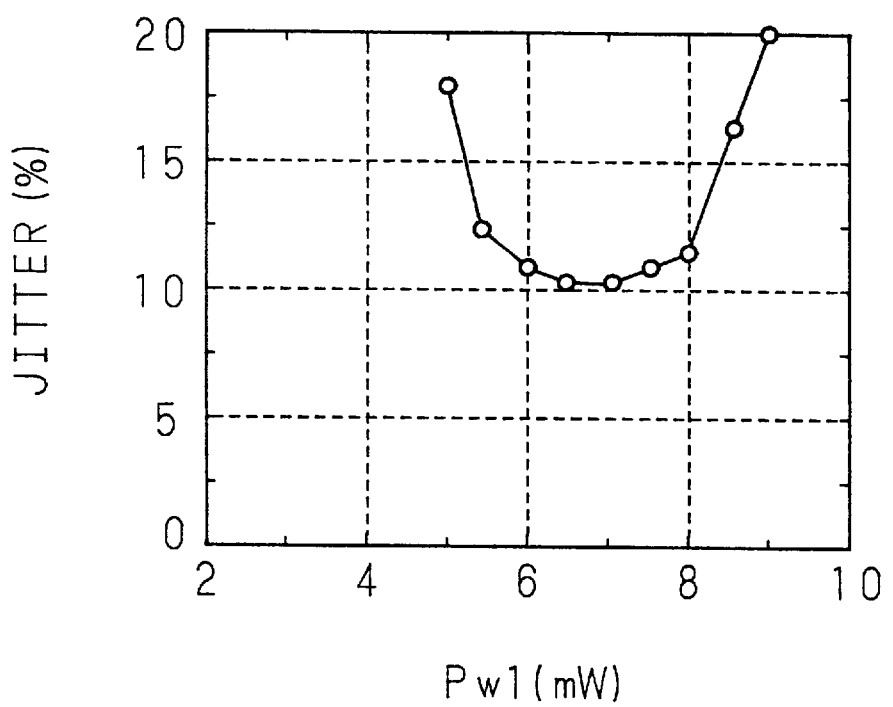
FIG. 17 is a graph showing recording power margin of recording mark formed according to the recording method shown in FIG. 15.

To compare further with the first embodiment, a recording mark was formed by a recording method of comparative example in which the preheat power value for forming the recording mark was same value as the preheat power value of the space, and the shift and the recording power margin were measured. FIG. 15 is a diagram showing recording waveform and the recording mark by the recording method of the comparative example. The magneto-optical disk used in the recording method of the comparative example has the same film composition as the magneto-optical recording disk D used in the first embodiment, and the measuring method of the shift and the recording power margin is same as in the first embodiment. FIG. 16 is a graph showing the results of measuring the shift of recording mark in comparative example, and FIG. 17 is a graph showing the result of determining the recording power margin by the recording method in the comparative example. The measuring method of the shift and the recording power margin is same as in FIG. 11 and FIG. 12.

As known from FIG. 16, the thermal-shift of recording mark in the comparative example is within ±10%, while the pattern-shift is out of ±10%. Also as known from FIG. 17, the recording power margin is found to be zero. Thus, in the comparative example, in the same way as in the prior art, it is considered that the shift and the jitter of recording mark are increased.

By contrast, in the first embodiment, the pattern-shift was ±2.5% and the thermal-shift was ±4%, and in the recording marks of 2T and 3T, the shift was not out of ±10%. The recording power margin was ±15.0%. Hence, even when the recording marks are formed at high density in the magneto-optical disk D capable of reproducing at MSR by the recording method of the first embodiment, the shift in high frequency recording can be sufficiently reduced, and the jitter can be substantially decreased.

Figure 18:
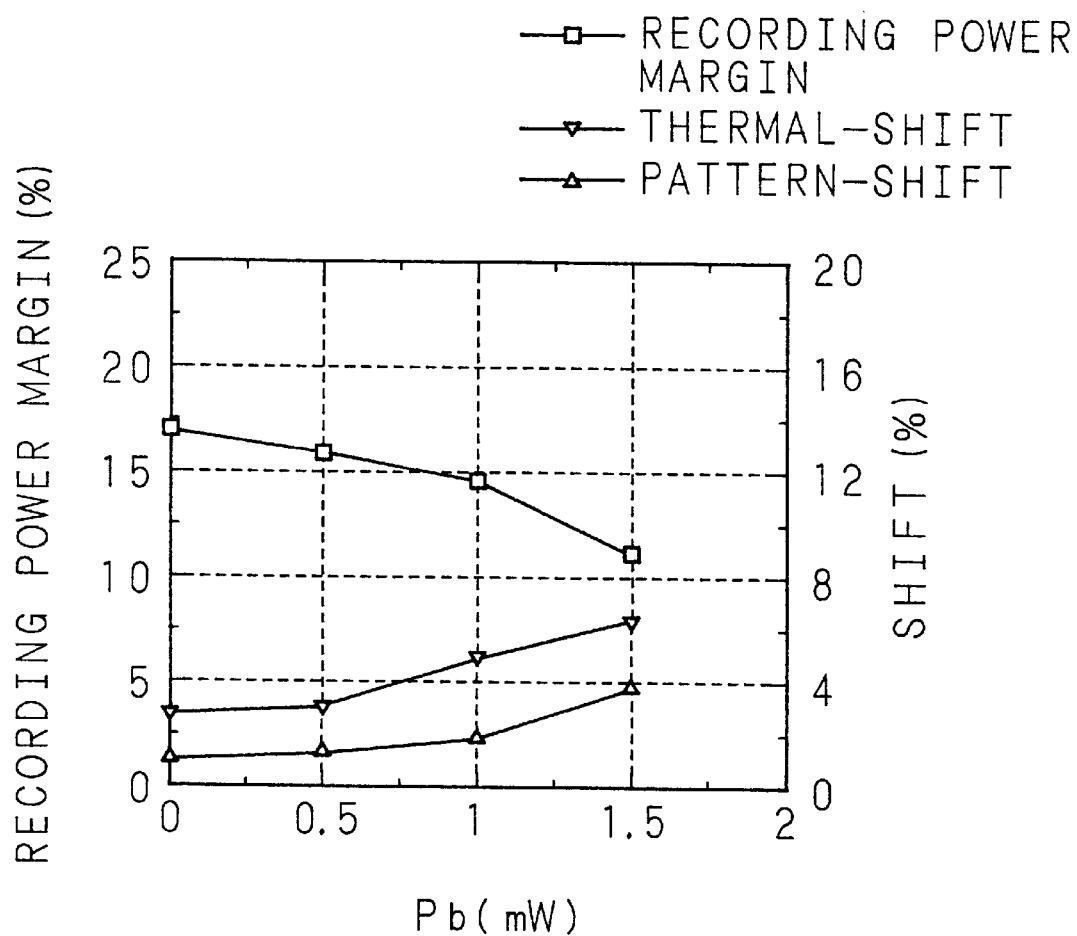
FIG. 18 is a graph showing recording power margin and shift in the case where Pb is varied in the recording method shown in FIG. 8.

In the recording method of the first embodiment, the changes of the shift and the recording power margin were investigated in the case where the power value Pb was varied. FIG. 18 is a graph showing the result, in which the axis of ordinates denotes the recording power margin (%) and the shift (%), and the axis of abscissas indicates the power value Pb (mW). Herein, the shift and the recording power margin indicate the absolute values of the shift range and the recording power margin measured at each power value Pb as shown in FIG. 11 and FIG. 12. At this time, the power value Pw1 was 6 mW, Pw2 was 6.2 mW, Paw was 3.0 mW, Pae was 1.2 mW, and the recording power margin was the value determined under varying the power value Pw1 as shown in FIG. 12.

As known from FIG. 18, when the power value Pb is 0 mW, the shift is minimum, and the recording power margin is maximum. Hence, in the recording method of the first embodiment, it is preferred to define the power value Pb at 0 mW.

Figure 19:
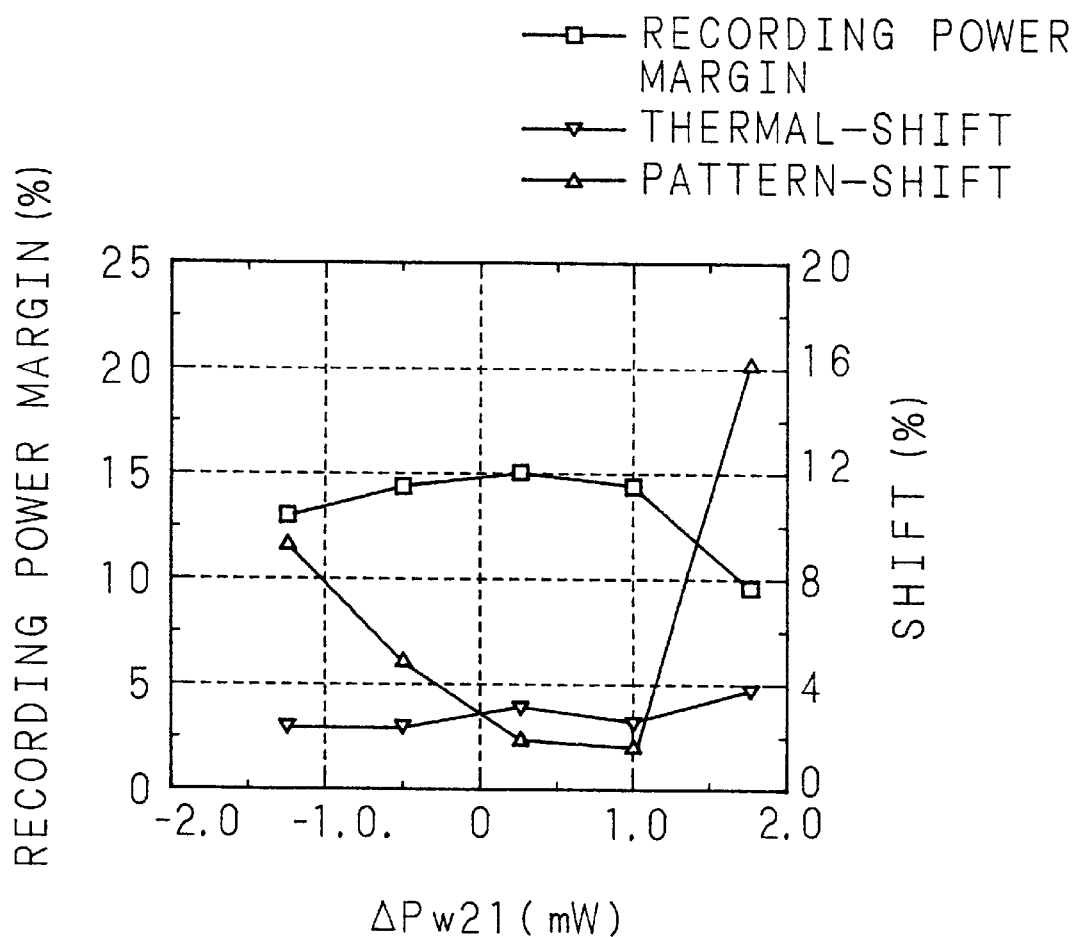
FIG. 19 is a graph showing recording power margin and shift in the case where (Pw2 - Pw1) is varied in the recording method shown in FIG. 8.

In the recording method of the first embodiment, when the value ΔPw21 obtained by subtracting power value Pw1 from power value Pw2 was varied, changes of the shift and the recording power margin were investigated. FIG. 19 is a graph showing the result, in which the axis of ordinates shows the recording power margin (%) and shift (%), and the axis of abscissas indicates the power value ΔPw21 (mW). Herein, the shift and the recording power margin indicate the values of the shift range and the recording power margin determined at each power value ΔPw21 in the same way as in FIG. 18. At this time, the power value Pw1 was 6 mW, Paw was 3.0 mW, Pae was 1.2 mW, Pb was 0 mW, and the recording power margin was the value determined by varying the power value Pw1 as shown in FIG. 12.

FIG. 19 shows that a sufficient margin can be obtained when the power value ΔPw21 is within ±1.0 mW. Accordingly, in the recording method of the embodiment, it is preferred to define the power value (Pw2-Pw1) at ±1.0 mW. Seeing also that the pattern-shift is 16% when the power value (Pw2-Pw1) is 1.7 mW, it is known that the factor for lowering the recording power margin is the pattern-shift.

Figure 20:
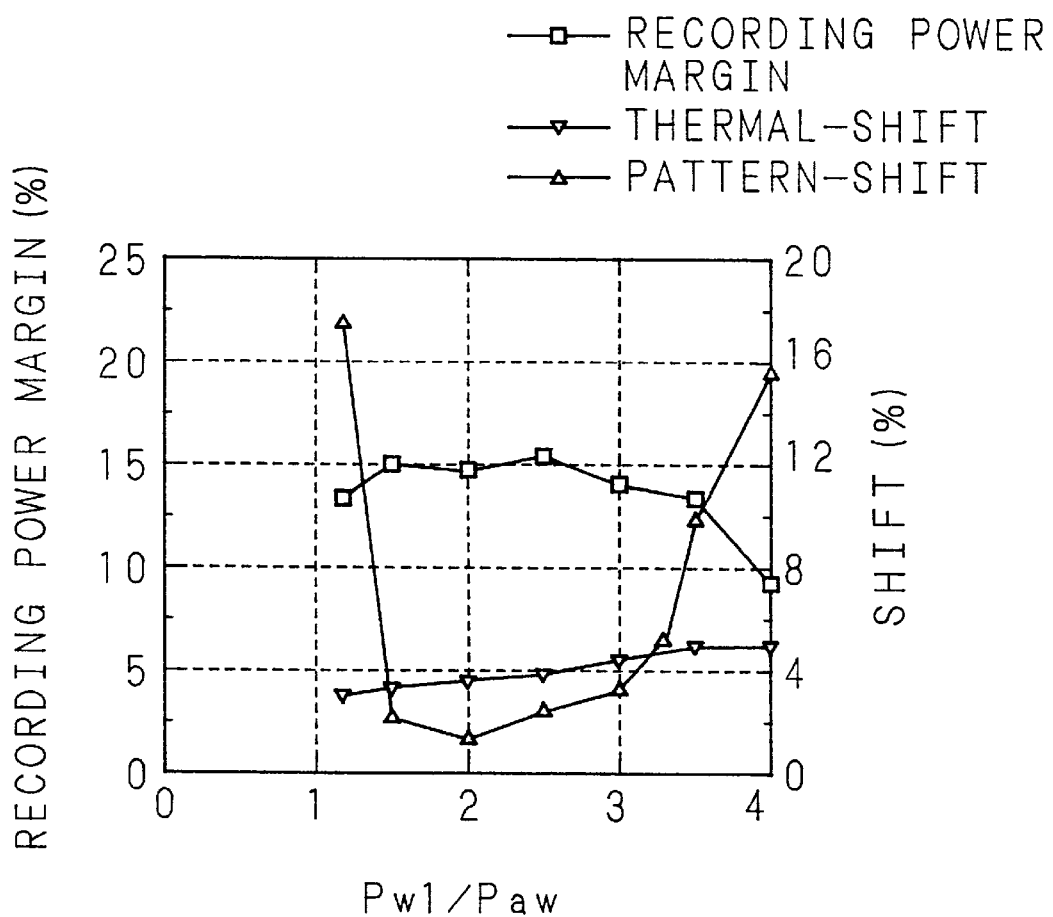
FIG. 20 is a graph showing recording power margin and shift in the case where Pw1/Paw is varied in the recording method shown in FIG. 8.

Moreover, in the recording method of the first embodiment, under varying the power value Pw1/Paw, changes of the shift and the recording power margin were investigated. FIG. 20 is a graph showing the result, in which the axis of ordinates indicate the recording power margin (%) and the shift (%), and the axis of abscissas denotes the power value Pw1/Paw. Herein, the shift and the recording power margin indicate the values of the shift range and the recording power margin about each power value Pw1/Paw in the same way as in FIG. 18. At this time, the power value Pw1 was 6 mW, Pw2 was 6.2 mW, Pae was 1.2 mW, Pb was 0 mW, and the recording power margin was the value determined by varying the power value Pw1 as shown in FIG. 12.

As known from FIG. 20, the shift and the recording power margin are sufficient values when the power value Pw1/Paw is in a range of 1.5 to 3. Hence, in the recording method of the first embodiment, it is preferred to define the power value Pw1/Paw in a range of 1.5 to 3.

Figure 21:
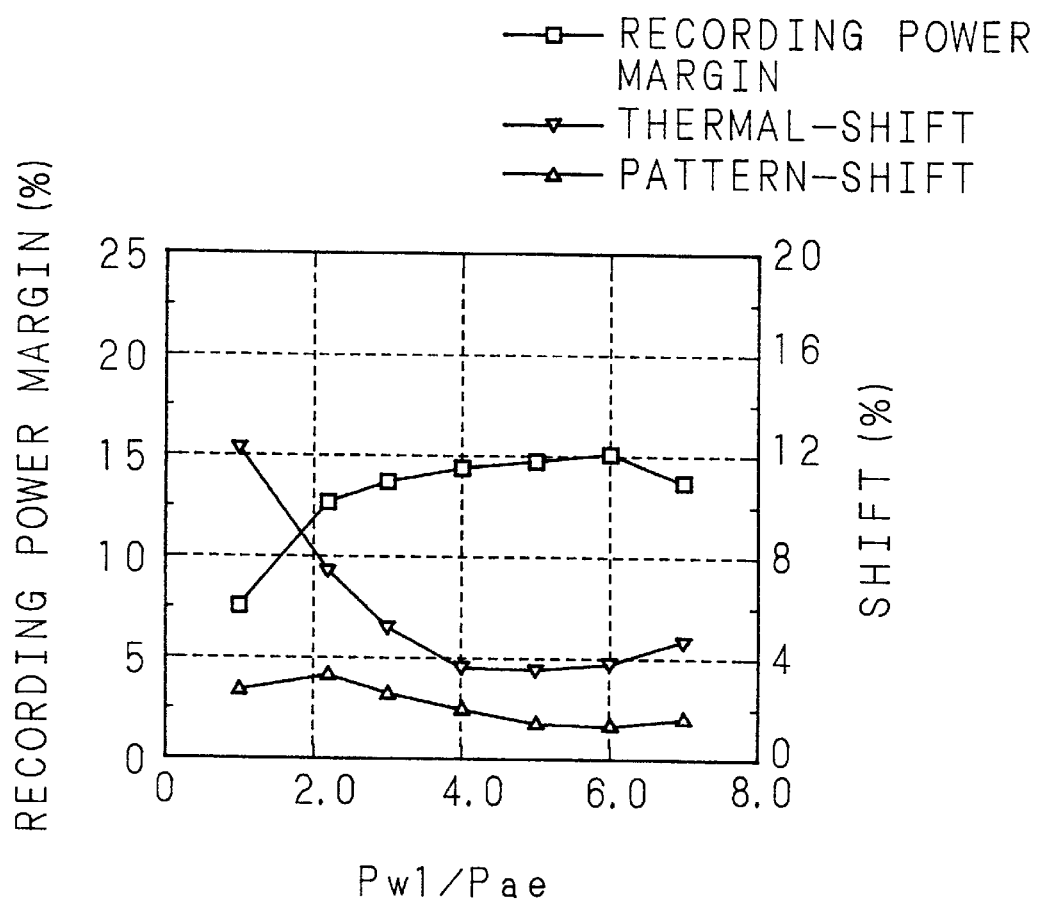
FIG. 21 is a graph showing recording power margin and shift in the case where Pw1/Pae is varied in the recording method shown in FIG. 8.

Still more, in the recording method of the first embodiment, under varying the power value Pw1/Pae, changes of the shift and the recording power margin were investigated. FIG. 21 is a graph showing the result, in which the axis of ordinates indicate the recording power margin (%) and the shift (%), and the axis of abscissas denotes the power value Pw1/Pae. Herein, the shift and the recording power margin indicate the values of the shift range and the recording power margin about each power value Pw1/Pae in the same way as in FIG. 18. At this time, the power value Pw1 was 6 mW, Pw2 was 6.2 mW, Paw was 3.0 mW, Pb was 0 mW, and the recording power margin was the value determined by varying the power value Pw1 as shown in FIG. 12.

As known from FIG. 21, the shift and the recording power margin are sufficient values when the power value Pw1/Pae is 2.0 or more. Accordingly, in the recording method of the first embodiment, it is preferred to define the power value Pw1/Pae at 2.0 or more. Incidentally, the maximum value of the power value Pw1/Pae is a value infinitely closest to an infinity due to the range limit of the lowest power value of laser beam.

Second embodiment

Figure 22:
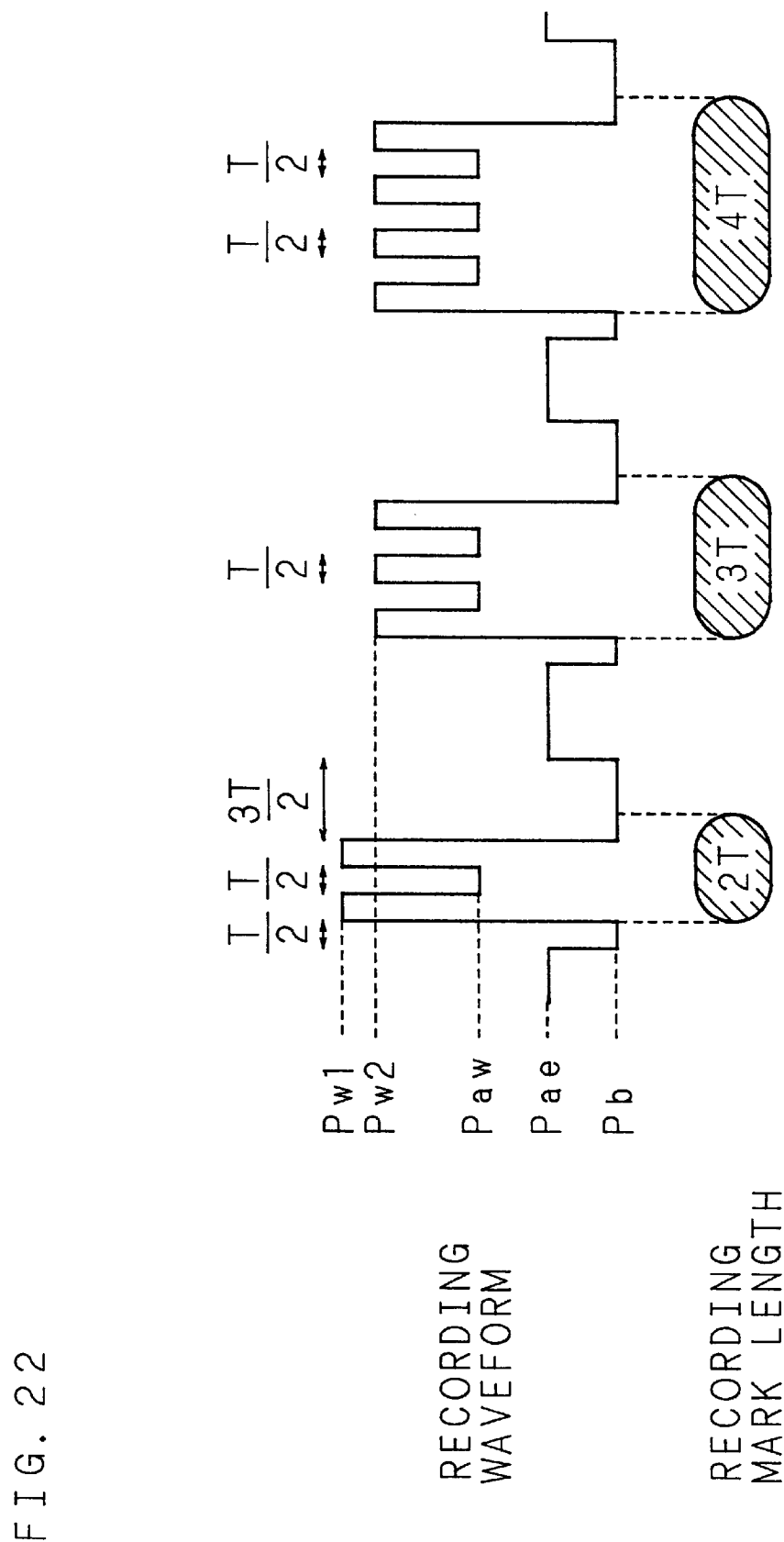
FIG. 22 is a diagram showing recording waveform and recording mark in a recording method in a second embodiment.

By recording into a RAD type MSR medium (RAD medium) by using the recording waveform in FIG. 8, it was found that the effect was not so high as in the abovementioned FAD type MSR medium (FAD medium). This is because a higher resolution is required in the RAD medium than in the FAD medium, that is, the aperture is narrower. Accordingly, using other recording waveform, (1,7)RLL modulation codes were recorded in both lands and grooves of the magneto-optical disk D which is a RAD medium. FIG. 22 is a diagram showing recording waveforms and recording marks obtained by the recording method of a second embodiment, in which recording marks are formed by multi-pulse recording method. The film composition of the magneto-optical disk D is same as the film composition shown in FIG. 6, and the substrate 31 and each layer have the following film material and film thickness, and the RAD system in MSR reproduction is possible in the same way as in the principle of reproduction explained in FIG. 1.

Substrate 31: Polycarbonate
Dielectric layer 32: SiN, 70 nm
Readout layer 33: GdFeCo (transition-metal magnetization dominant), 40 nm
Intermediate layer 34: GdFe (rare-earth magnetization dominant), 40 nm
Recording layer 35: TbFeCo (transition-metal magnetization dominant), 50 nm
Protective layer 36: SiN, 60 nm As shown in FIG. 22, in the recording mark forming portion of mark length of 2T, laser beam is emitted at the power value Pw1 for (1/2)T period, at the power value Paw for (1/2)T period, at the power value Pw1 again for (1/2)T period, and at the power value Pb for (1/2)T period. In the space portion, in succession, laser beam is emitted at the power value Pb for (1/2)T period, at the power value Pae until (1/2)T period before the next recording mark forming portion, and at the power value Pb for (1/2)T period.

In the recording mark forming portion of 3T, laser beam is emitted at the power value Pw2 for (1/2)T period, at the power value Paw for (1/2)T period, at the power value Pw2 for (1/2)T period, at the power value Paw for (1/2)T period, at the power value Pw2 again for (1/2)T period, and at the power value Pb for (1/2)T period. In the recording mark forming portion of 4T, laser beam is emitted at the power value Pw2 for (1/2)T period, at the power value Paw and power value Pw2 for (1/2)T period alternately three times each, and at the power value Pb for (1/2)T period. In the embodiment, accordingly, in the recording mark forming portion, pulse beam of power value Pw1 at the upper edge and power value Paw at the lower edge is used in the shortest mark (2T), and pulse beam of Pw2 at the upper edge and Paw at the lower edge is used emitted by the number according to the length of the recording mark, in the 3T and longer mark.

As mentioned above, each space is irradiated with laser beam at the power value Pb for T period, and at the power value Pae until (1/2)T period before the next recording mark forming portion, and at the power value Pb for (1/2)T period, and therefore by irradiating with the laser beam of power value Pb for the beginning T period and for the ending (1/2)T period, the edges of the recording mark are formed sharply. Moreover, by irradiating with the laser beam at the power value Pb for (1/2)T period at the end of each recording mark forming portion, effects of accumulated heat onto the next recording mark are alleviated.

Meanwhile, in this embodiment, the power values of laser beam satisfy the relation of Pw1>Paw, Pw1>Pae, Pw1>Pb, Pw2>Paw, Pw2>Pae, Pw2>Pb, Paw>Pb, Pae>Pb, Paw≠Pae. The on/off control of the switches when emitting the laser beam at each power is same as in the first embodiment, and the explanation is omitted herein.

Thus, in the recording system of the second embodiment, the power value of laser beam is modulated into four values of Pw1, Pw2, Paw, Pb when forming the recording mark, and modulated into two values of Pae and Pb when forming the space, and hence information is recorded in the magneto-optical disk D by using a total of five power values.

Figure 23:
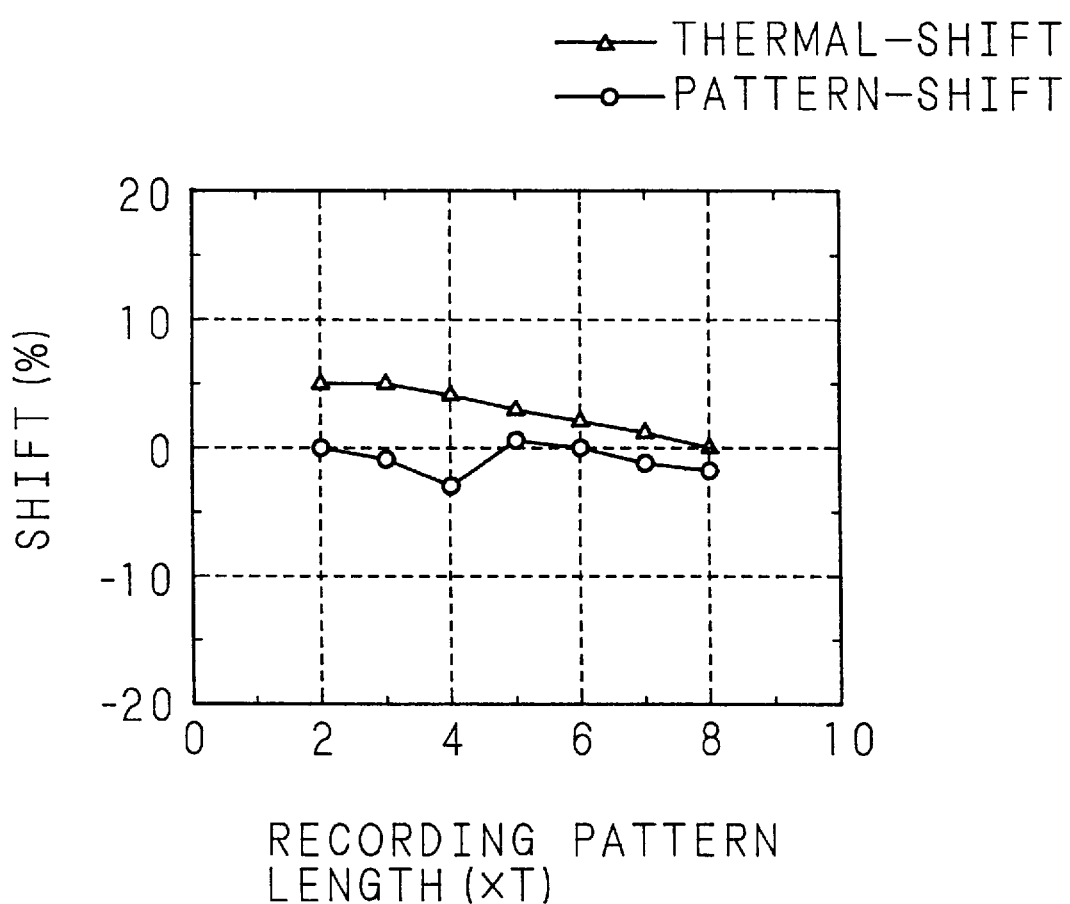
FIG. 23 is a graph showing edge shift of recording mark formed by the recording method shown in FIG. 22.
Figure 24:
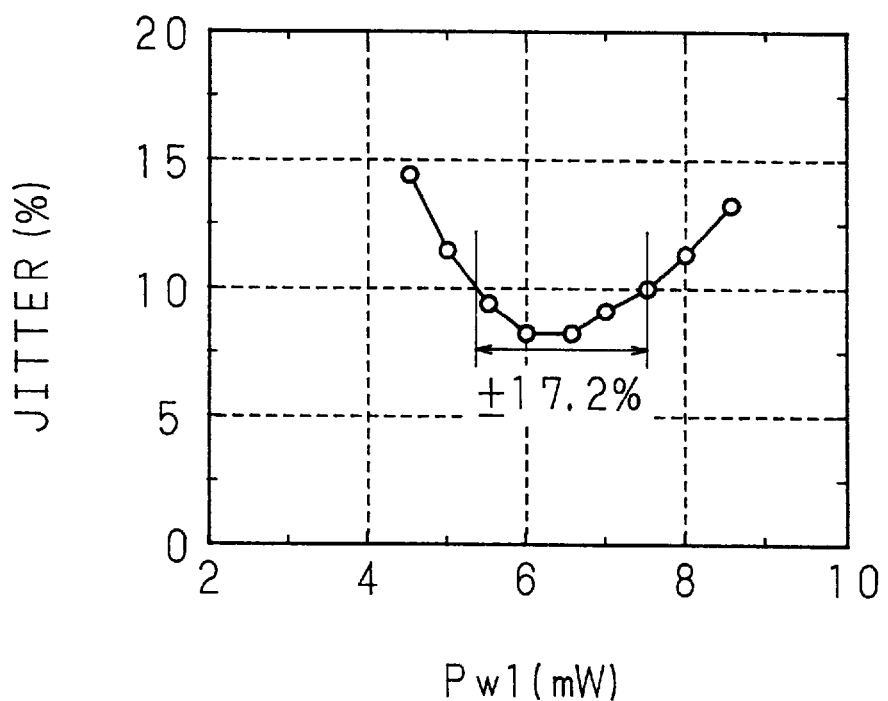
FIG. 24 is a graph showing recording power margin of recording mark formed by the recording method shown in FIG. 22.

The edge shift and the jitter of the recording mark thus formed in this recording system were measured in the same manner as in the first embodiment. FIG. 23 is a graph showing the result of measurement of the shift of recording mark, and FIG. 24 is a graph showing the result of determining the recording power margin. As known from FIG. 23 and FIG. 24, the respective range of pattern-shift and thermal-shift is both within ±10%, and the recording power margin is ±17.2%.

In the second embodiment, recording marks similar to the comparative example shown in FIG. 15 were formed, and the edge shift and the jitter were measured, and all values were found to be inferior to those of the second embodiment. Hence, when the recording marks are formed at high density in the magneto-optical disk D capable of reproducing at MSR by the recording method of the second embodiment, the shift in high frequency recording can be sufficiently reduced, and the jitter can be substantially decreased.

Figure 25:
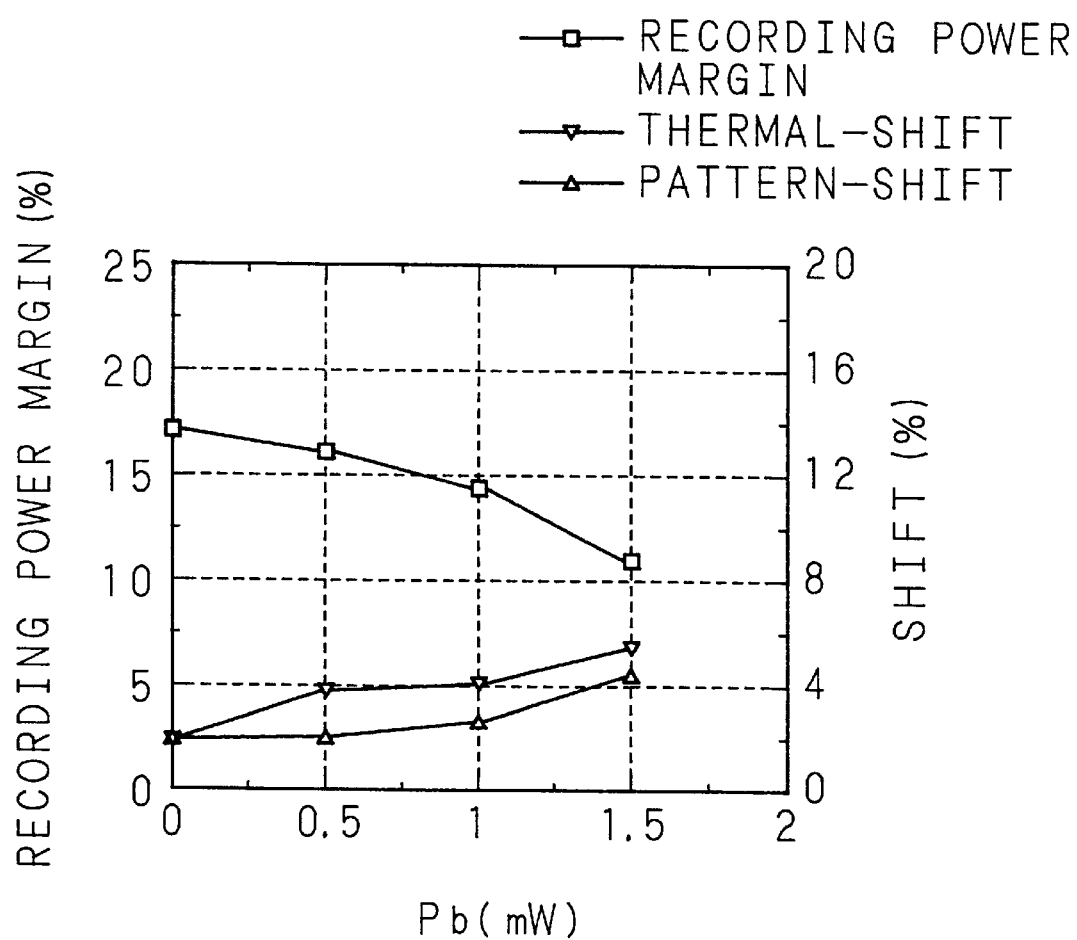
FIG. 25 is a graph showing recording power margin and shift in the case where Pb is varied in the recording method shown in FIG. 22.

In the recording method of the second embodiment, under varying the power value Pb, changes of shift and the recording power margin were investigated. FIG. 25 is a graph showing the result, and as known from FIG. 25, when the power value Pb is 0 mW, the shift is minimum, and the recording power margin is maximum. Hence, in the recording method of the second embodiment, it is preferred to define the power value Pb at 0 mW. At this time, the power value Pw1 was 6.4 mW, Pw2 was 6.0 mW, Paw was 3.0 mW, Pae was 1.4 mW, and the recording power margin was the value determined by varying the power value Pw1 as shown in FIG. 12.

Figure 26:
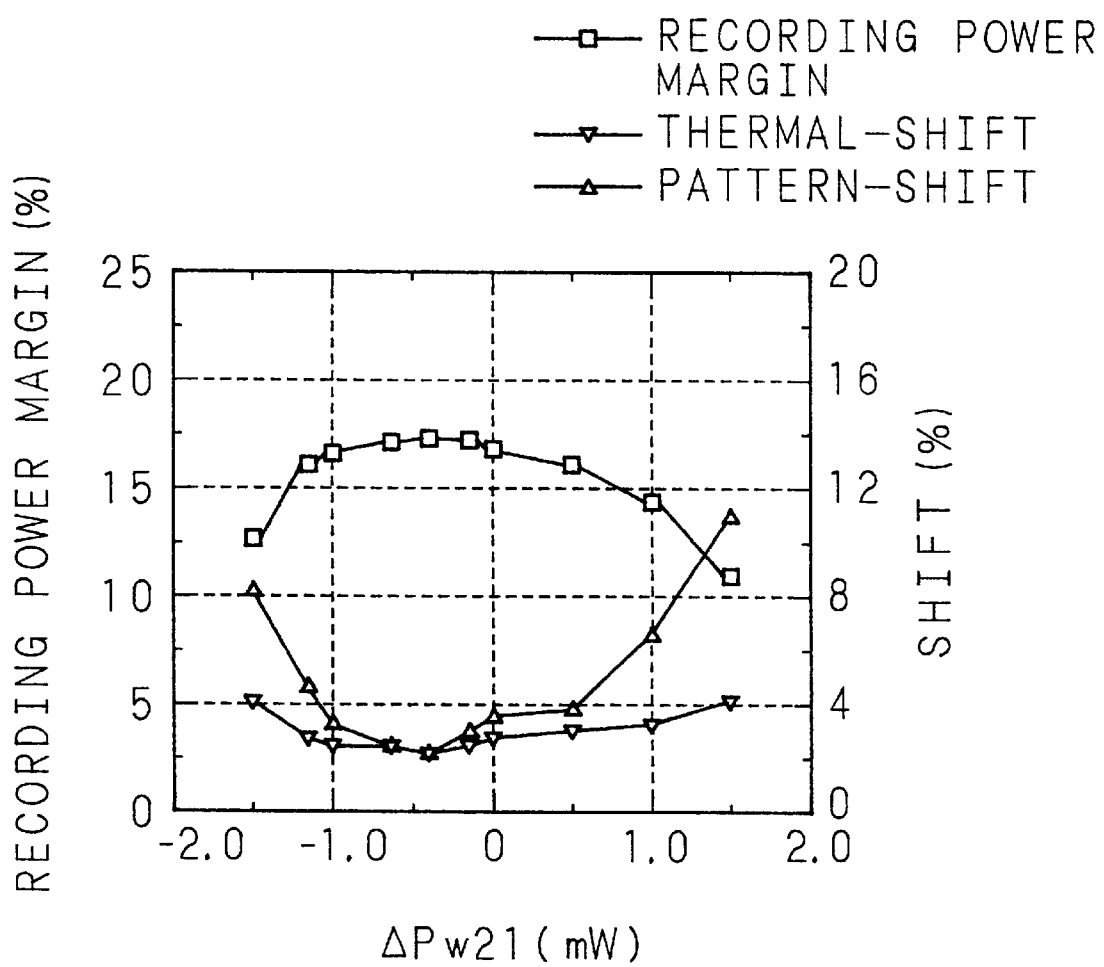
FIG. 26 is a graph showing recording power margin and shift in the case where (Pw2 - Pw1) is varied in the recording method shown in FIG. 22.

In the recording method of the second embodiment, when the value ΔPw21 obtained by subtracting power value Pw1 from power value Pw2 was varied, changes of the shift and the recording power margin were investigated. FIG. 26 is a graph showing the result, and as known from FIG. 26, a sufficient margin can be obtained when the power value ΔPw21 is within −1.5 mW to +1.0 mW. Accordingly, in the recording method of the second embodiment, it is preferred to define the power value (Pw2−Pw1) within −1.5 mW to +1.0 mW.

Seeing also that the pattern-shift is 16% when the power value (Pw2−Pw1) is 1.7 mW, it is known that the factor for lowering the recording power margin is the pattern-shift. At this time, the power value Pw1 was 6.4 mW, Paw was 3.0 mW, Pae was 1.4 mW, Pb was 0 mW, and the recording power margin was the value determined by varying the power value Pw1 as shown in FIG. 12.

Figure 27:
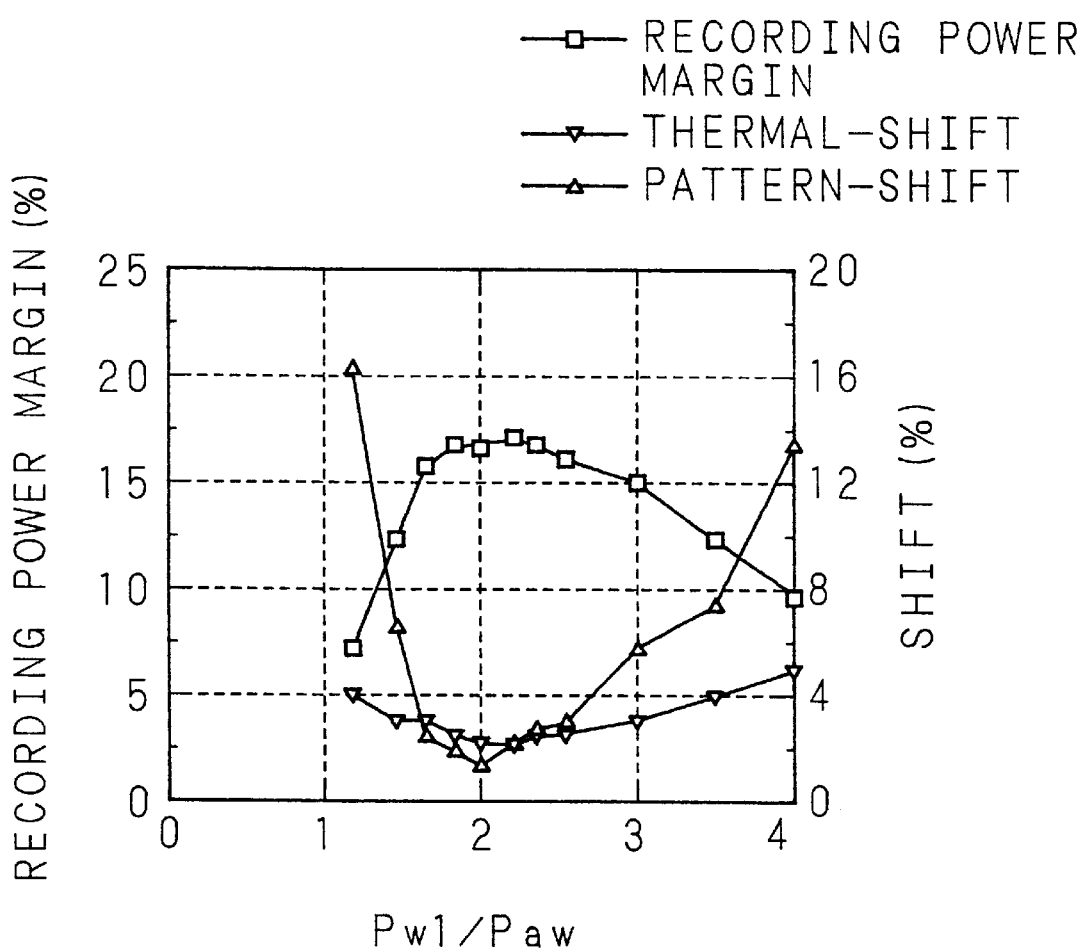
FIG. 27 is a graph showing recording power margin and shift in the case where Pw1/Paw is varied in the recording method shown in FIG. 22.

Moreover, in the recording method of the second embodiment, under varying the power value Pw1/Paw, changes of the shift and the recording power margin were investigated. FIG. 27 is a graph showing the result, and as known from FIG. 27, the shift and the recording power margin are sufficient values when the power value Pw1/Paw is in a range of 1.5 to 3.5. Hence, in the recording method of the second embodiment, it is preferred to define the power value Pw1/Paw in a range of 1.5 to 3.5. At this time, the power value Pw1 was 6.4 mW, Pw2 was 6.0 mW, Pae was 1.4 mW, Pb was 0 mW, and the recording power margin was the value determined by varying the power value Pw1 as shown in FIG. 12.

Figure 28:
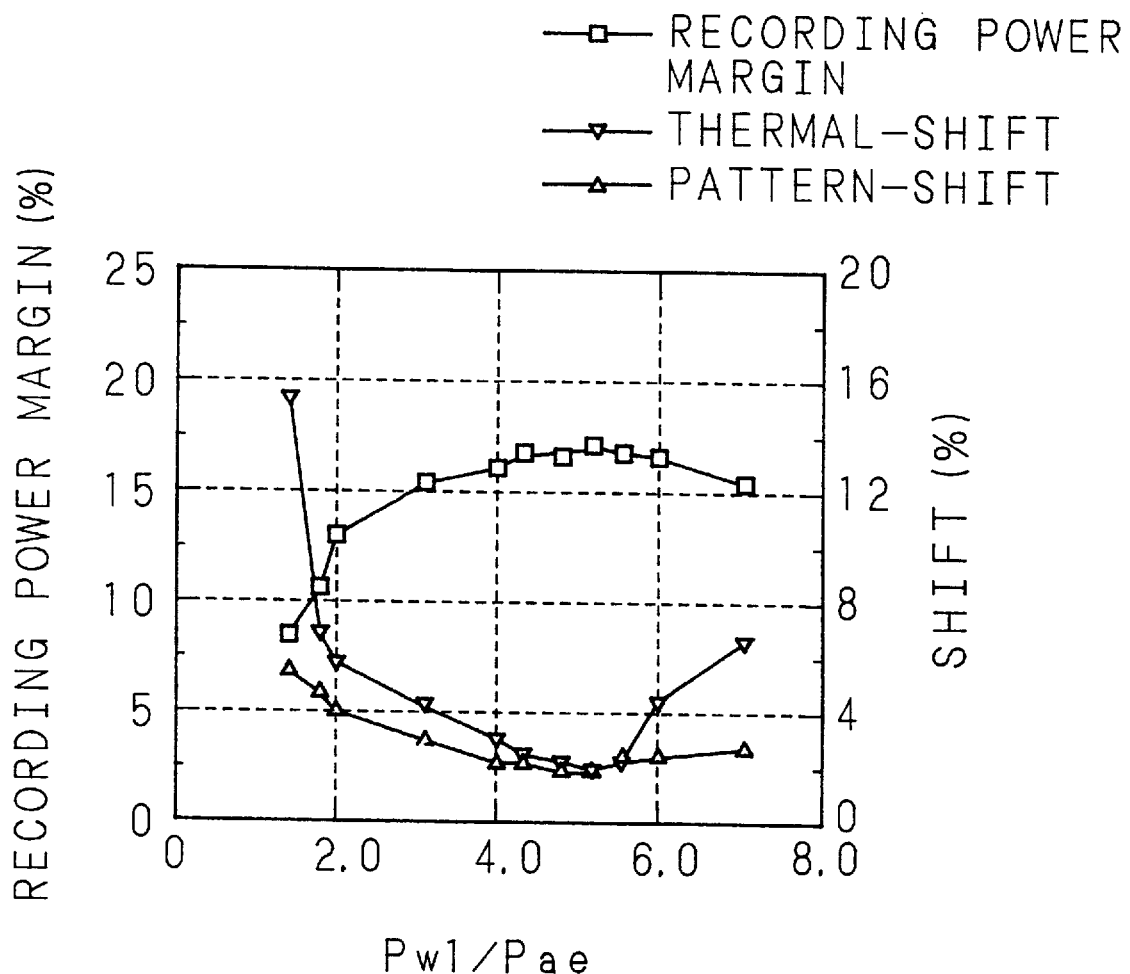
FIG. 28 is a graph showing recording power margin and shift in the case where Pw1/Pae is varied in the recording method shown in FIG. 22.

Still more, in the recording method of the second embodiment, under varying the power value Pw1/Pae, changes of the shift and the recording power margin were investigated. FIG. 28 is a graph showing the result, and as known from FIG. 28, the shift and the recording power margin are sufficient values when the power value Pw1/Pae is 1.8 or more. Accordingly, in the recording method of the second embodiment, it is preferred to define the power value Pw1/Pae at 1.8 or more. At this time, the power value Pw1 was 6.4 mW, Pw2 was 6.0 mW, Paw was 3.0 mW, Pb was 0 mW, and the recording power margin was the value determined by varying the power value Pw1 as shown in FIG. 12. Incidentally, the maximum value of the power value Pw1/Pae is a value infinitely closest to an infinity due to the range limit of the lowest power value of laser beam.

Meanwhile, the graphs shown in FIG. 23 to FIG. 28 show the results of measuring in the same way as in the graphs shown in FIG. 11, FIG. 12, and FIG. 18 to FIG. 21.

Third embodiment

Figure 29:
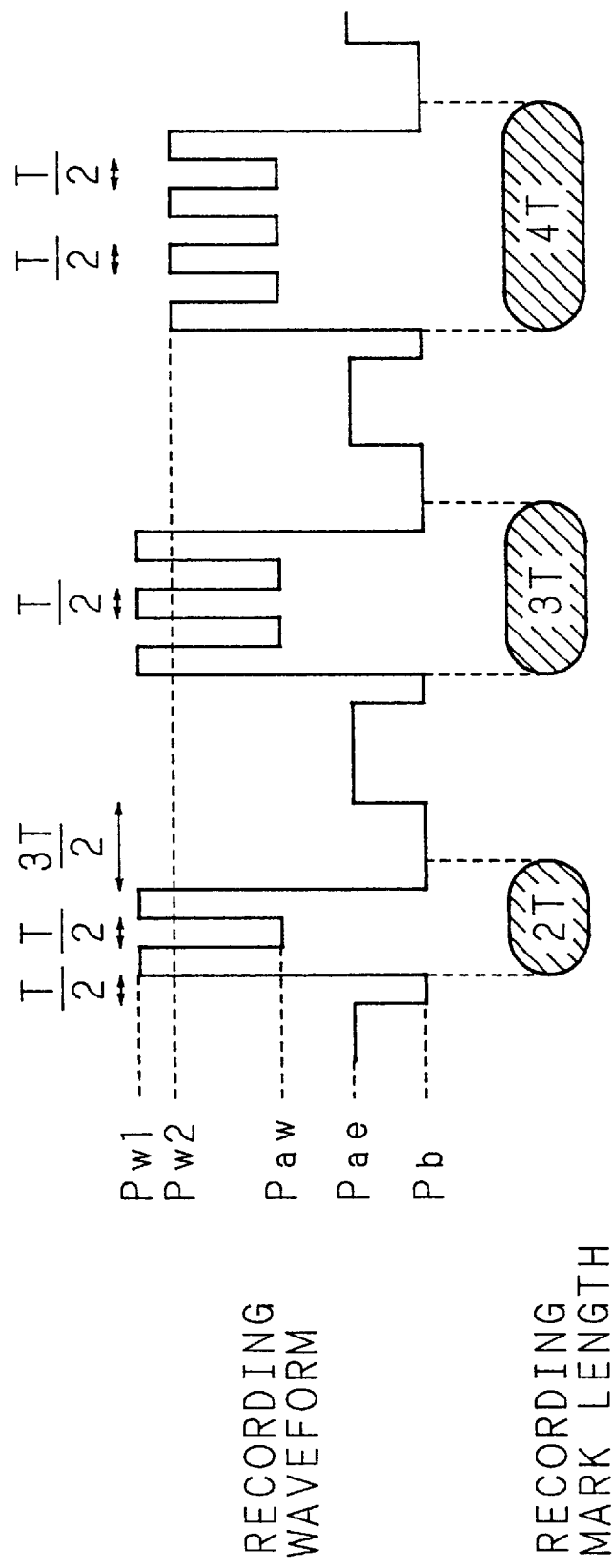
FIG. 29 is a diagram showing recording waveform and recording mark according to a recording method in a third embodiment.

By using a different recording waveform, (1,7)RLL modulation codes were recorded in both lands and grooves of a magneto-optical disk D which is a RAD medium. FIG. 29 is a diagram showing recording waveforms and recording marks by the recording method of a third embodiment, in which recording marks are formed by multi-pulse recording method. The film composition of the magneto-optical disk D is same as the film composition shown in FIG. 7, and the substrate 31 and each layer have the following film material and film thickness, and the RAD system in MSR reproduction is possible in the same way as in the principle of reproduction explained in FIG. 1.

Substrate 31: Polycarbonate
Dielectric layer 32: SiN, 70 nm
Readout layer 33: GdFeCo (transition-metal magnetization dominant), 35 nm
Intermediate layer 34: GdFe (rare-earth magnetization dominant), 35 nm
Recording layer 35: TbFeCo (transition-metal magnetization dominant), 45 nm
Protective layer 36: SiN, 90 nm
Reflection layer 37: AlTi, 15 nm As shown in FIG. 29, in the recording mark forming portion of mark length of 2T, laser beam is emitted at the power value Pw1 for (1/2)T period, at the power value Paw for (1/2)T period, at the power value Pw1 again for (1/2)T period, and at the power value Pb for (1/2)T period. In the space portion, in succession, the laser beam is emitted at the power value Pb for T period, at the power value Pae until (1/2)T period before the next recording mark forming portion, and at the power value Pb for (1/2)T period.

In the recording mark forming portion of 3T, laser beam is emitted at the power value Pw1 for (1/2)T period, at the power value Paw for (1/2)T period, at the power value Pw1 for (1/2)T period, at the power value Paw for (1/2)T period, at the power value Pw1 again for (1/2)T period, and at the power value Pb for (1/2)T period. In the recording mark forming portion of 4T, laser beam is emitted at the power value Pw2 for (1/2)T period, at the power value Paw and power value Pw2 for (1/2)T period alternately three times each, and at the power value Pb for (1/2)T period. In the embodiment, accordingly, in the recording mark forming portion, pulse beam of power value Pw1 at the upper edge and power value Paw at the lower edge is used in the shortest mark (2T) and 3T recording mark, and pulse beam of Pw2 at the upper edge and Paw at the lower edge is used emitted by the number according to the length of the recording mark, in the 4T and longer mark.

Each space is irradiated with laser beam at the power value Pb for T period, and at the power value Pae until (1/2)T period before the next recording mark forming portion, and at the power value Pb for (1/2)T period, and therefore by irradiating with the laser beam of power value Pb for the beginning T period and for the ending (1/2)T period, the edges of the recording mark are formed sharply. Moreover, by irradiating with the laser beam at the power value Pb for (1/2)T period at the end of each recording mark, effects of accumulated heat onto the next recording mark are alleviated.

Meanwhile, in this embodiment, the power values of laser beam satisfy the relation of Pw1>Paw, Pw1>Pae, Pw1>Pb, Pw2>Paw, Pw2>Pae, Pw2>Pb, Paw>Pb, Pae>Pb, Paw≠Pae. The on/off control of the switches when emitting the laser beam at each power value is same as in the first embodiment, and the explanation is omitted herein.

Thus, in the recording system of the third embodiment, the power value of laser beam is modulated into four values of Pw1, Pw2, Paw, Pb when forming the recording mark, and modulated into two values of Pae and Pb when forming the space, and hence information is recorded in the magneto-optical disk D by using a total of five power values.

Figure 30:
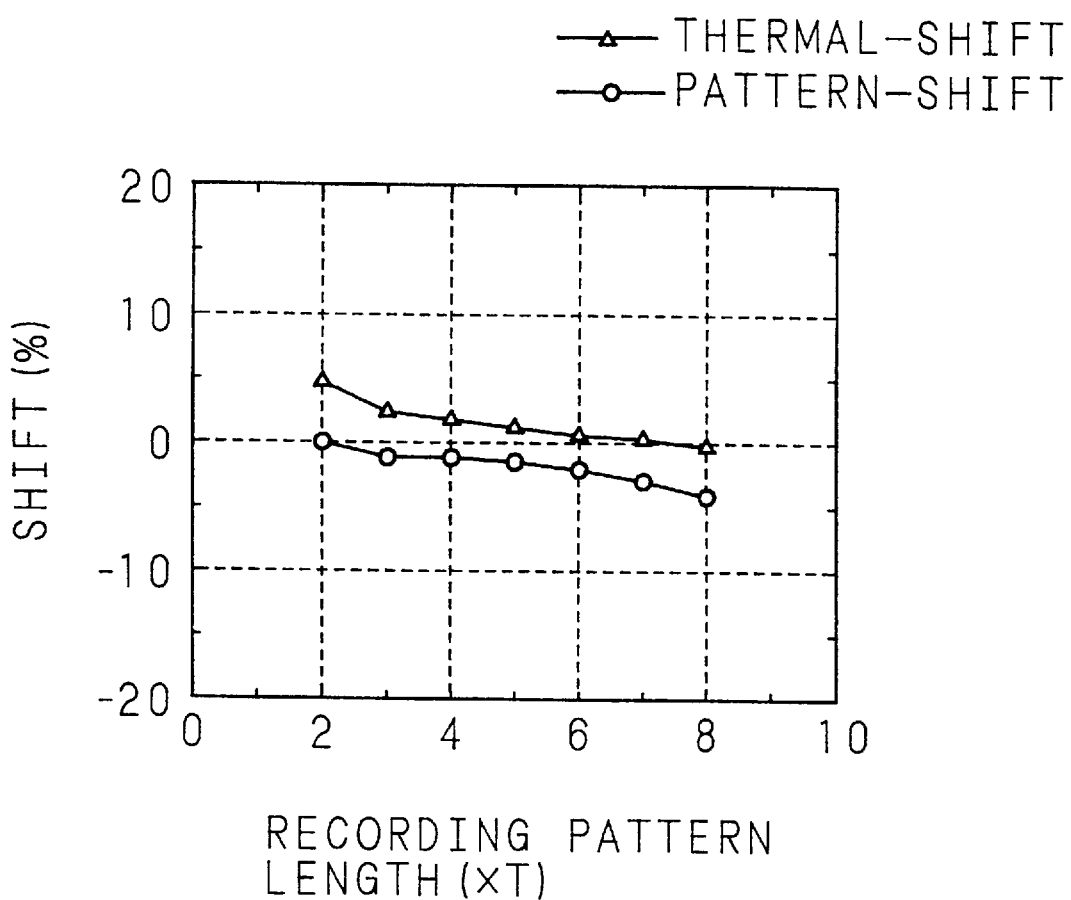
FIG. 30 is a graph showing edge shift of recording mark formed by the recording method shown in FIG. 29.
Figure 31:
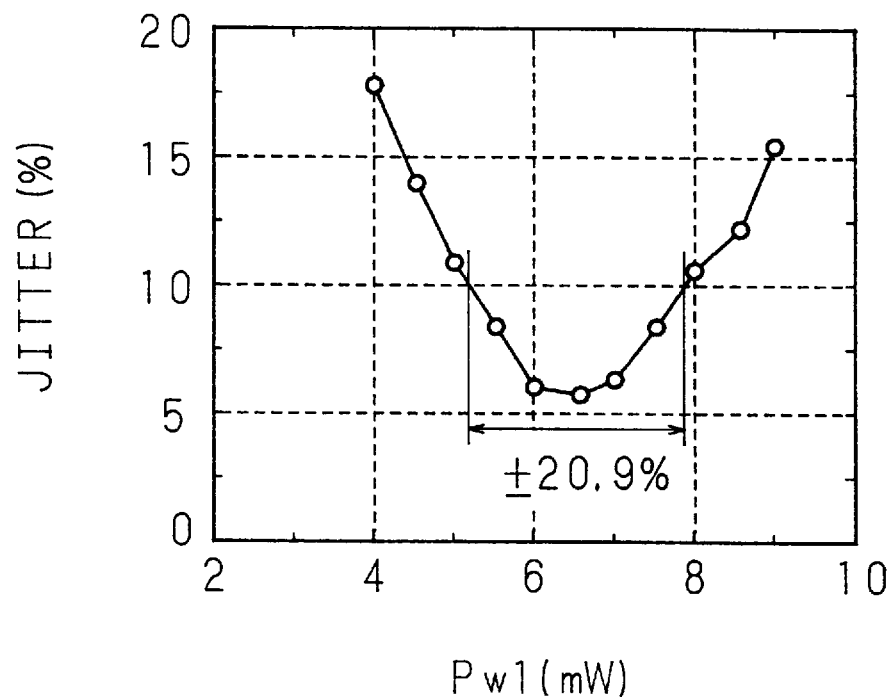
FIG. 31 is a graph showing recording power margin of recording mark formed by the recording method shown in FIG. 29.

The edge shift and the jitter of the recording mark thus formed by this recording system were measured in the same manner as in the first embodiment. FIG. 30 is a graph showing the result of measurement of shift of recording mark, and FIG. 31 is a graph showing the result of determining the recording power margin. As known from FIG. 30 and FIG. 31, respective the range of pattern-shift and the thermal-shift is both within ±10%, and the recording power margin is ±20.9%.

In the third embodiment, recording marks similar to the comparative example shown in FIG. 15 were formed, and the edge shift and the jitter were measured, and all values were found to be inferior to those of the third embodiment. Hence, when the recording marks are formed at high density in the magneto-optical disk D capable of reproducing at MSR by the recording method of the third embodiment, the shift in high frequency recording can be sufficiently reduced, and the jitter can be substantially decreased.

Figure 32:
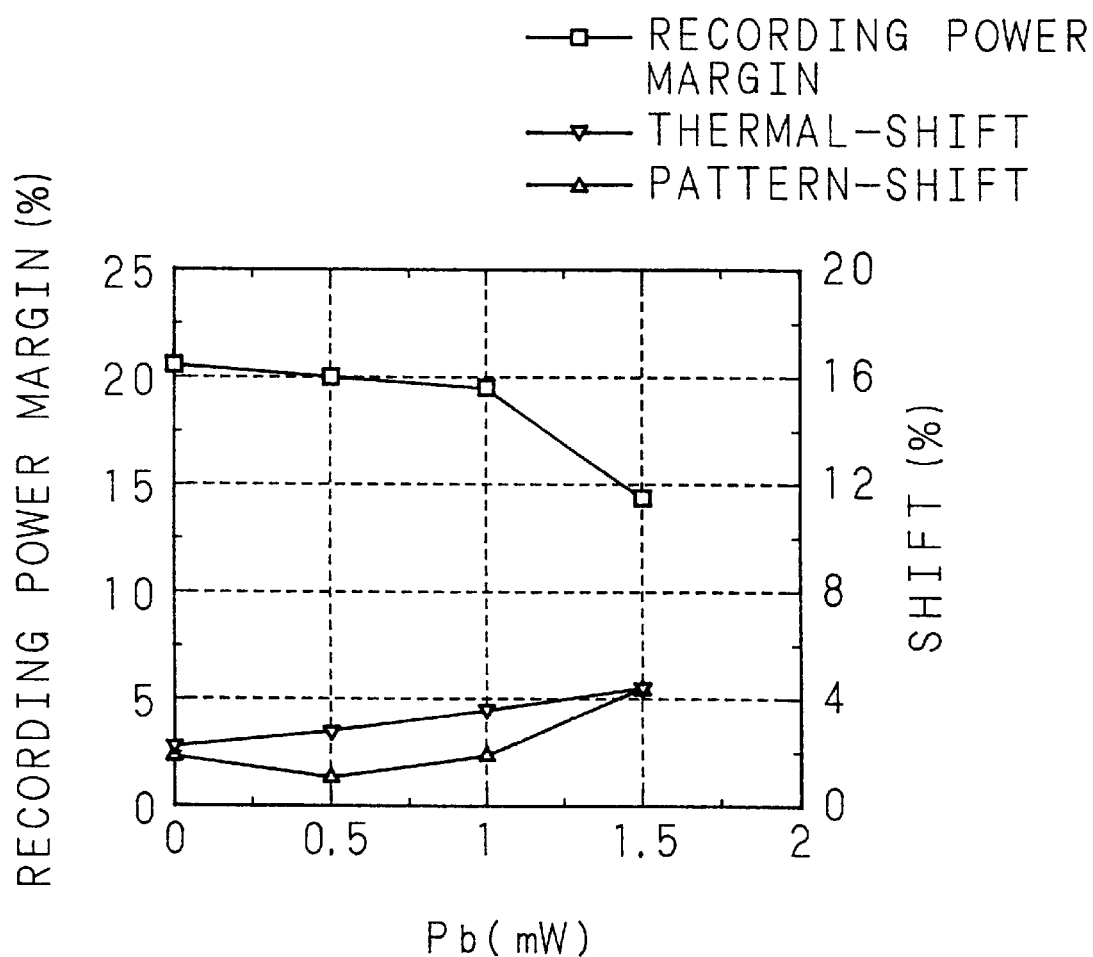
FIG. 32 is a graph showing recording power margin and shift in the case where Pb is varied in the recording method shown in FIG. 29.

In the recording method of the third embodiment, under varying the power value Pb, changes of shift and the recording power margin were investigated. FIG. 32 is a graph showing the result, and as known from FIG. 32, when the power value Pb is 0 mW, the shift is minimum, and the recording power margin is maximum. Hence, in the recording method of the third embodiment, it is preferred to define the power value Pb at 0 mW. At this time, the power value Pw1 was 7.0 mW, Pw2 was 6.0 mW, Paw was 2.8 mW, Pae was 2.2 mW, and the recording power margin was the value determined by varying the power value Pw1 as shown in FIG. 12.

Figure 33:
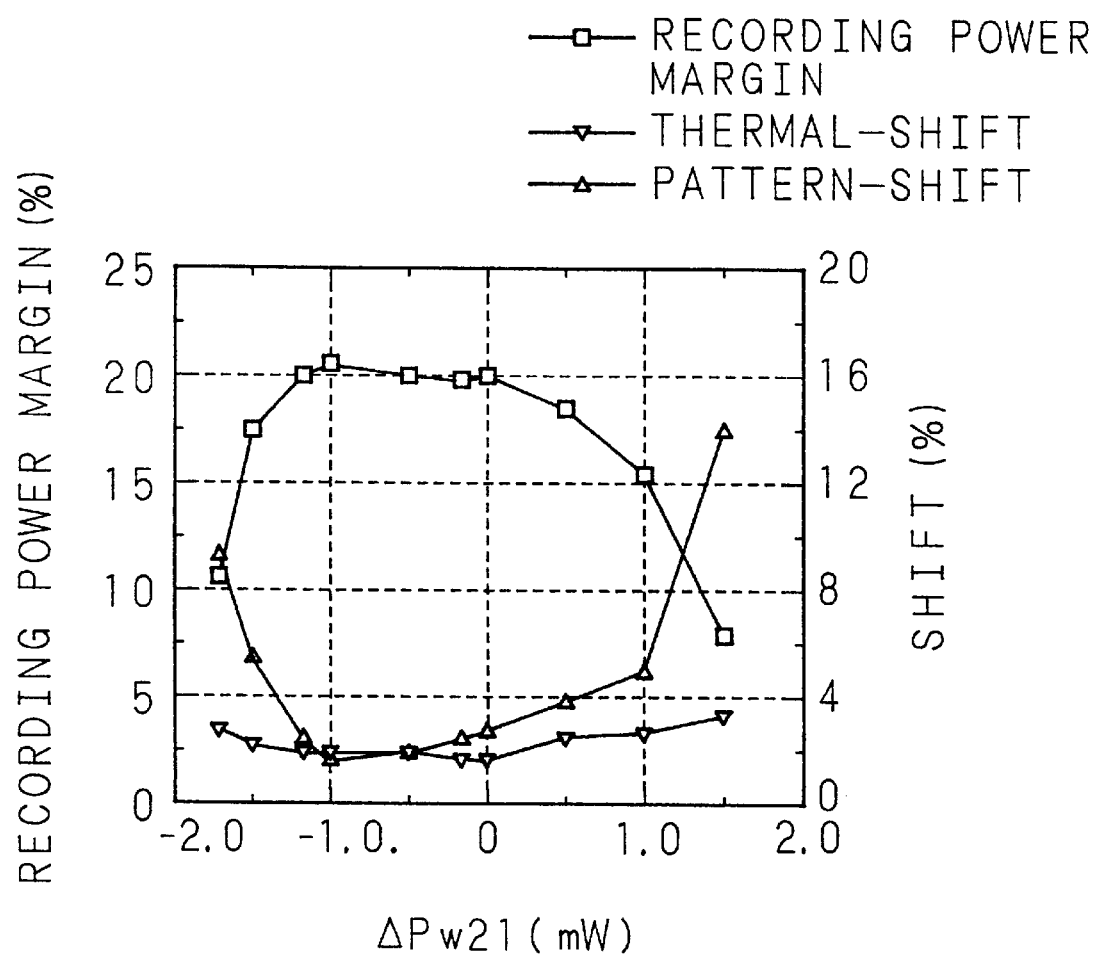
FIG. 33 is a graph showing recording power margin and shift in the case where (Pw2 - Pw1) is varied in the recording method shown in FIG. 29.

In the recording method of the third embodiment, when the value ΔPw21 obtained by subtracting Pw1 from power value Pw2 was varied, changes of the shift and the recording power margin were investigated. FIG. 33 is a graph showing the result, and as known from FIG. 33, a sufficient margin can be obtained when the power value ΔPw21 is within −1.5 mW to +1.0 mW. Accordingly, in the recording method of the third embodiment, it is preferred to define the power value (Pw2-Pw1) within −1.5 mW to +1.0 mW. At this time, the power value Pw1 was 7.0 mW, Paw was 2.8 mW, Pae was 2.2 mW, Pb was 0 mW, and the recording power margin was the value determined by varying the power value Pw1 as shown in FIG. 12.

Figure 34:
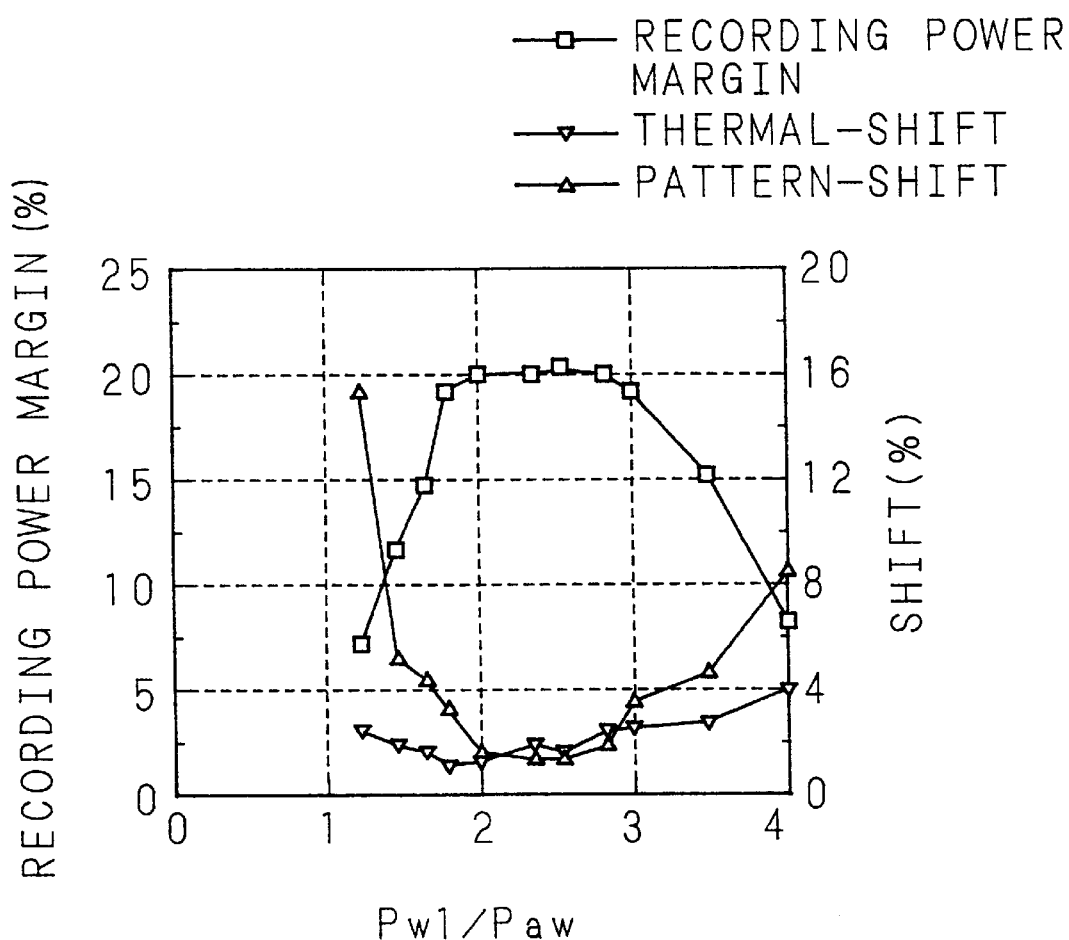
FIG. 34 is a graph showing recording power margin and shift in the case where Pw1/Paw is varied in the recording method shown in FIG. 29.

Moreover, in the recording method of the third embodiment, under varying the power value Pw1/Paw, changes of the shift and the recording power margin were investigated. FIG. 34 is a graph showing the result, and as known from FIG. 34, the shift and the recording power margin are sufficient values when the power value Pw1/Paw is in a range of 1.5 to 3.5. Hence, in the recording method of the third embodiment, it is preferred to define the power value Pw1/Paw in a range of 1.5 to 3.5. At this time, the power value Pw1 was 7.0 mW, Pw2 was 6.0 mW, Pae was 2.2 mW, Pb was 0 mW, and the recording power margin was the value determined by varying the power value Pw1 as shown in FIG. 12.

Figure 35:
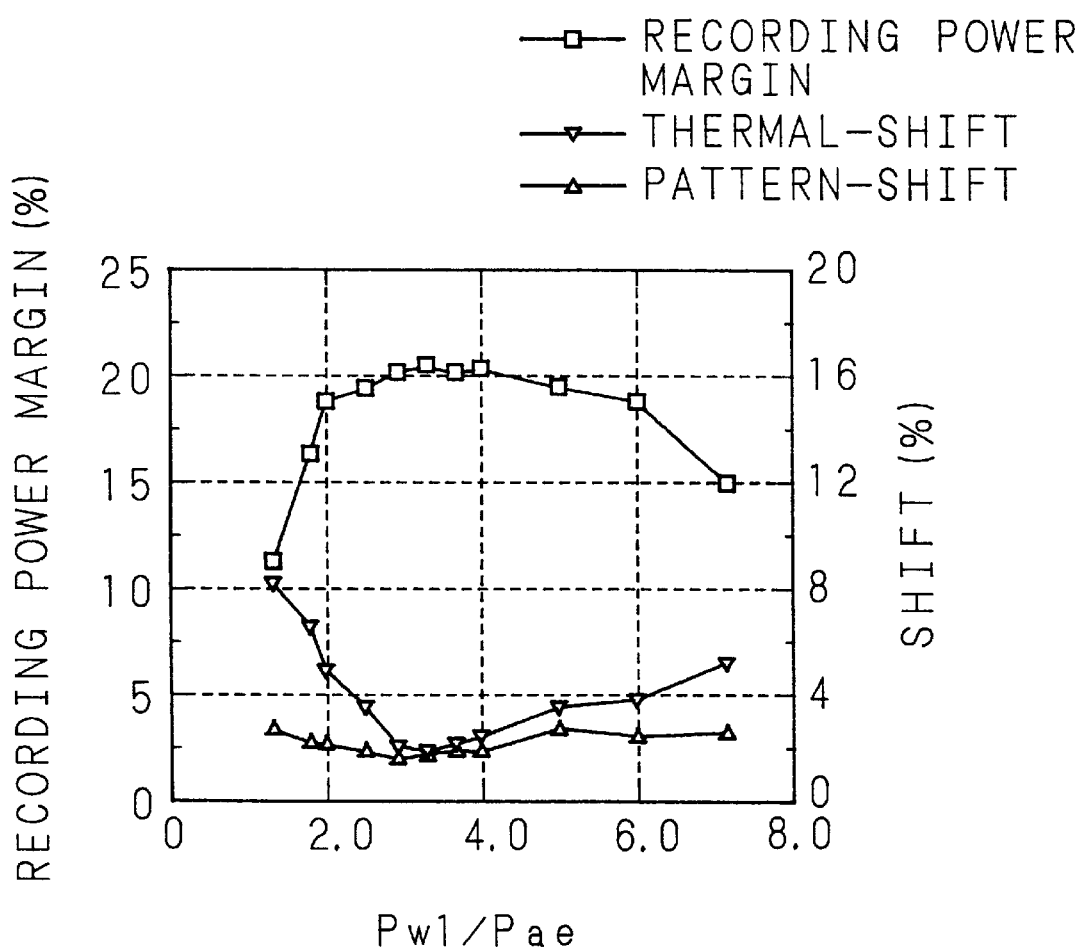
FIG. 35 is a graph showing recording power margin and shift in the case where Pw1/Pae is varied in the recording method shown in FIG. 29.

Still more, in the recording method of the third embodiment, under varying the power value Pw1/Pae, changes of the shift and the recording power margin were investigated. FIG. 35 is a graph showing the result, and as known from FIG. 35, the shift and the recording power margin are sufficient values when the power value Pw1/Pae is 1.8 or more. Accordingly, in the recording method of the third embodiment, it is preferred to define the power value Pw1/Pae at 1.8 or more. At this time, the power value Pw1 was 7.0 mW, Pw2 was 6.0 mW, Paw was 2.8 mW, Pb was 0 mW, and the recording power margin was the value determined by varying the power value Pw1 as shown in FIG. 12. Incidentally, the maximum value of the power value Pw1/Pae is a value infinitely closest to an infinity due to the range limit of the lowest power value of laser beam.

Meanwhile, the graphs shown in FIG. 30 to FIG. 35 show the results of measuring in the same way as in the graphs shown in FIG. 11, FIG. 12, and FIG. 18 to FIG. 21.

Moreover, specs for a medium of 3.5-inch in which information of 2GB can be recorded at one side is realized, by the first to third embodiments.

The medium used in the recording method of the invention is not limited to the film composition of magneto-optical disk in the above-mentioned embodiments, but by using the magneto-optical recording medium having the following film material and film thickness, the same effects as in the first to third embodiments may be obtained.

MSR medium A (FAD medium shown in FIG. 6)

Substrate 31: Polycarbonate
Dielectric layer 32: SiN, 70 nm
Readout layer 33: GdFeCo (rare-earth magnetization dominant), 30 nm
Intermediate layer 34: TbDyFe (transition-metal magnetization dominant), 10 nm
Recording layer 35: TbFeCo (transition-metal magnetization dominant), 50 nm
Protective layer 36: SiN, 90 nm MSR medium B (FAD medium shown in FIG. 7)

Substrate 31: Polycarbonate Dielectric layer 32: SiN, 70 nm
Readout layer 33: GdFeCo (rare-earth magnetization dominant), 25 nm Intermediate layer 34: TbDyFe (transition-metal magnetization dominant), 8 nm
Recording layer 35: TbFeCo (transition-metal magnetization dominant), 45 nm
Protective layer 36: SiN, 1100 nm
Reflection layer: AlTi, 20 nm MSR medium C (RAD medium shown in FIG. 6)

Substrate 31: Polycarbonate
Dielectric layer 32: SiN, 70 nm
Readout layer 33: DyFeCo (rare-earth magnetization dominant), 40 nm
Intermediate layer 34: GdFe (rare-earth magnetization dominant), 35 nm
Recording layer 35: TbFeCo (transition-metal magnetization dominant), 50 nm
Protective layer 36: SiN, 60 nm Furthermore, in the foregoing first to third embodiments, the pulse lower edge of the recording mark forming portion is the power value Paw, but not limited to this. Even when the pulse lower edge of the recording mark forming portion is, for example, the power value Pae, nearly same effects can be obtained by raising the pulse upper edge by the power value (Paw-Pae), and using five power values.

Moreover, when the ambient temperature is changed or when the peripheral speed is changed due to change of the recording radius position of the magneto-optical disk, it is of course effective to vary the recording power condition relatively while keeping constant the ratio of the respective power values. Or by trial writing with the ratio of the power values kept in constant state, it is possible to determine each power value securely.

Thus, in the invention, using at least four power values of light beam for forming the recording marks and using at least five power values for forming the recording marks and space, when recording marks are formed at high density on the magneto-optical recording medium capable of reproducing at MSR, the shift of recording marks of short mark length can be sufficiently reduced, and the jitter is substantially decreased, and thus the invention provides excellent effects.

As the invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

We claim:

1. An information recording method of an optical recording medium for recording binary information from a series of recording marks and spaces between the recording marks, comprising the steps of:

determining the length of the recording mark and the space depending on the information to be recorded so that one of the binary information corresponds to one of a front edge and a rear edge of the recording mark; and irradiating the optical recording medium with a light beam by pulse emission of the light beam, in accordance with the length of the recording mark and the space, wherein the light beam is emitted at least in five power values including a bottom power value which is the lowest edge of the pulse when forming the recording marks and the spaces between the marks such that when forming the recording mark, the light beam is emitted at least in three power values including the bottom power value, and when forming the space, the light beam is emitted in at least two power values including the bottom power value.

2. An information recording method of an optical recording medium for recording binary information by a series of recording marks and spaces between the recording marks, comprising the steps of:

determining the length of the recording mark and the space depending on the information to be recorded so that one of the binary information corresponds to one of a front edge and a rear edge of the recording mark; and irradiating the optical recording medium with a light beam by pulse emission of the light beam, in accordance with the length of the recording mark and the space, wherein the light beam is emitted at bottom power value Pb for cooling the optical recording medium, first main heat power value Pw1, second main heat power value Pw2 and first preheat power value Paw for forming the recording mark, and second preheat power value Pae for forming the space, and the following relation holds;

Pw1>Paw, Pw1>Pae, Pw1>Pb
Pw2>Paw, Pw2>Pae, Pw2>Pb
Paw>Pb, Pae>Pb, Paw≠Pae.

3. An information recording method according to claim 1, wherein the power value of light beam for forming the recording mark is different from the power value for forming the space, except for the bottom power value.

4. An information recording method according to claim 1, wherein the bottom power value is zero.

5. An information recording method according to claim 2, wherein the bottom power value Pb satisfies the relation of Pb=0.

6. An information recording method according to claim 2, wherein the first main heat power value Pw1 and second main heat power value Pw2 satisfy the relation of Pw1−1.5 mW≦Pw2≦Pw1+1.5 mW.

7. An information recording method according to claim 2, wherein the first main heat power value Pw1 and the first preheat power value Paw satisfy the relation of 1.5 mW≦Pw1/Paw≦3.5 mW.

8. An information recording method according to claim 2, wherein the first main heat power value Pw1 and the second preheat power value Pae satisfy the relation of 1.8≦Pw1/Pae.

9. An information recording method according to claim 3, wherein the bottom power value is zero.

* * * * *